(12) United States Patent
Xue et al.

(10) Patent No.: US 10,450,918 B2
(45) Date of Patent: Oct. 22, 2019

(54) EXHAUST GAS TREATMENT SYSTEM

(71) Applicant: BASF Corporation, Florham Park, NJ (US)

(72) Inventors: Wen-Mei Xue, Dayton, NJ (US); John K. Hochmuth, Raritan, NJ (US)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 15/735,509

(22) PCT Filed: Jun. 10, 2016

(86) PCT No.: PCT/US2016/036958
§ 371 (c)(1),
(2) Date: Dec. 11, 2017

(87) PCT Pub. No.: WO2016/201276
PCT Pub. Date: Dec. 15, 2016

(65) Prior Publication Data
US 2018/0156090 A1 Jun. 7, 2018

Related U.S. Application Data

(60) Provisional application No. 62/174,862, filed on Jun. 12, 2015.

(51) Int. Cl.
| F01N 3/10 | (2006.01) |
| F01N 3/20 | (2006.01) |
| B01J 23/44 | (2006.01) |
| F01N 13/00 | (2010.01) |

(52) U.S. Cl.
CPC .............. *F01N 3/101* (2013.01); *B01J 23/44* (2013.01); *F01N 3/103* (2013.01); *F01N 3/106* (2013.01); *F01N 3/2073* (2013.01); *F01N 13/0097* (2014.06); *F01N 2510/063* (2013.01)

(58) Field of Classification Search
CPC combination set(s) only.
See application file for complete search history.

(56) References Cited

U.S. PATENT DOCUMENTS

| 9,114,363 B2* | 8/2015 | Devarakonda | .......... F01N 3/101 |
| 9,138,686 B2 | 9/2015 | Kim et al. | |
| 9,657,626 B2* | 5/2017 | Theis | ................. B01D 53/9477 |

(Continued)

FOREIGN PATENT DOCUMENTS

CN 102387856 A 3/2012

*Primary Examiner* — Binh Q Tran
(74) *Attorney, Agent, or Firm* — Baltazar Gomez

(57) ABSTRACT

Described are exhaust gas treatment systems for treatment of a gasoline engine exhaust gas stream. The exhaust gas treatment systems comprise an ammonia generating and hydrocarbon oxidation catalyst, a TWC catalyst, and an ammonia selective catalytic reduction (SCR) catalyst downstream of the TWC catalyst. The ammonia generating and hydrocarbon oxidation catalyst comprises a refractory metal oxide support, a platinum component, and a palladium component. The ammonia generating and hydrocarbon oxidation catalyst is substantially free of ceria and substantially free of $NO_x$ storage components. The platinum and palladium components are present in a platinum to palladium ratio of greater than about 1 to 1.

20 Claims, 17 Drawing Sheets

(56) References Cited

U.S. PATENT DOCUMENTS

| | | |
|---|---|---|
| 2002/0131914 A1 | 9/2002 | Sung |
| 2010/0107606 A1 | 5/2010 | Narayanaswamy et al. |
| 2010/0251700 A1* | 10/2010 | Wan ............... F01N 3/0231 60/287 |
| 2010/0257843 A1 | 10/2010 | Hoke et al. |
| 2013/0081378 A1 | 4/2013 | Bisaiji et al. |
| 2013/0259779 A1 | 10/2013 | Kim et al. |
| 2014/0050627 A1* | 2/2014 | Mende ............ B01D 53/944 422/171 |
| 2014/0186244 A1* | 7/2014 | Blakeman ........ B01J 35/0006 423/213.5 |
| 2014/0248200 A1 | 9/2014 | Wan et al. |
| 2014/0271429 A1 | 9/2014 | Kazi et al. |
| 2014/0301923 A1 | 10/2014 | Tang et al. |
| 2015/0298061 A1 | 10/2015 | Irisawa |

\* cited by examiner

EXHAUST GAS TREATMENT SYSTEM

CROSS-REFERENCE TO RELATED APPLICATIONS

The present application is a U.S. National Stage of International Patent Application PCT/US2016/036958, filed Jun. 10, 2016 and claims priority to U.S. Provisional Patent Application No. 62/174,862, filed Jun. 12, 2015. The disclosures of each of the applications noted above are incorporated herein by reference in their entirety.

TECHNICAL FIELD OF THE INVENTION

The present invention relates generally to the field of gasoline engine exhaust after-treatment systems.

BACKGROUND OF THE INVENTION

Exhaust gas from vehicles powered by gasoline engines is typically treated with one or more three-way conversion (TWC) automotive catalysts, which are effective to abate nitrogen oxides ($NO_x$), carbon monoxide (CO), and hydrocarbon (HC) pollutants in the exhaust gas of engines operated at or near stoichiometric air/fuel conditions. The precise proportion of air to fuel which results in stoichiometric conditions varies with the relative proportions of carbon and hydrogen in the fuel. An air-to-fuel (A/F) ratio is stoichiometric when complete combustion of a hydrocarbon fuel, such as gasoline, to carbon dioxide ($CO_2$) and water occurs. The symbol $\lambda$ is used to represent the result of dividing a particular A/F ratio by the stoichiometric A/F ratio for a given fuel, so that: $\lambda=1$ is a stoichiometric mixture, $\lambda>1$ is a fuel-lean mixture, and $\lambda<1$ is a fuel-rich mixture.

Gasoline engines having electronic fuel injection systems provide a constantly varying air-fuel mixture that quickly and continually cycles between lean and rich exhaust. Recently, to improve fuel-economy, gasoline-fueled engines are being designed to operate under lean conditions. Lean conditions refers to maintaining the ratio of air to fuel in the combustion mixtures supplied to such engines above the stoichiometric ratio so that the resulting exhaust gases are "lean," i.e., the exhaust gases are relatively high in oxygen content. Lean burn gasoline direct injection (GDI) engines offer fuel efficiency benefits that can contribute to a reduction in greenhouse gas emissions, carrying out fuel combustion in excess air. A major byproduct of lean combustion is $NO_x$, the after-treatment of which remains a major challenge.

Emission of nitrogen oxides ($NO_x$) must be reduced to meet emission regulation standards. TWC catalysts typically comprise a platinum group metal supported on an oxygen storage component and/or a refractory metal oxide support, and, optionally, an additional platinum group metal component supported on a second refractory metal oxide support or a second oxygen storage component. TWC catalysts, however, are not effective for reducing $NO_x$ emissions when the gasoline engine runs lean because of excessive oxygen in the exhaust gas. Two of the most promising technologies for reducing $NO_x$ under an oxygen-rich environment are urea selective catalytic reduction (SCR) and the lean $NO_x$ trap (LNT). Urea SCR systems require a secondary fluid tank with an injection system, resulting in added system complexity. Other concerns for urea SCR include urea infrastructure, the potential freezing of urea solution, and the need for drivers to periodically fill the urea solution reservoir.

Gasoline engines, particularly lean-burn gasoline engines, offer significant potential for improving fuel efficiency and reducing $CO_2$ emissions. Three-way conversion (TWC) catalysts operating under lean conditions can generally perform HC oxidation, but the lightoff temperature is generally above 300° C. The engine-out temperature during lean excursion can be much lower than during stoichiometric operation, which poses a challenge in hydrocarbon (HC) conversion. TWC catalysts do not efficiently convert hydrocarbons at low temperatures (e.g. below 250° C.). Further, in lean-burn gasoline engines, $NO_x$ reduction is a challenge, because TWC catalysts cannot convert $NO_x$ under lean conditions. One of the exhaust architectures for lean-gasoline applications is the passive $NH_3$—SCR system, which involves the use of an upstream catalyst to generate ammonia ($NH_3$) (during fuel-rich conditions) for use by a downstream $NH_3$—SCR for $NO_x$ reduction. Generation of $NH_3$ over the upstream catalyst is the most important aspect of the passive $NH_3$ approach, and increasing the conversion efficiency of engine-out $NO_x$ to $NH_3$ is the key factor for improved $NO_x$ reduction efficiency. Maximizing engine-out $NO_x$ to $NH_3$ conversion is also critical for improved fuel efficiency because $NH_3$ generation consumes fuel.

To meet current governmental emissions regulations, there is a need for a technology that addresses both hydrocarbon (HC) conversion under lean conditions at low temperature and $NO_x$ emissions and does not negatively impact $NH_3$ formation in gasoline engine applications.

SUMMARY OF THE INVENTION

A first aspect of the present invention relates to a gasoline exhaust gas treatment system. In a first embodiment, a gasoline engine exhaust gas treatment system comprises: an ammonia generating and hydrocarbon oxidation catalyst comprising a refractory metal oxide support, a platinum component, and a palladium component, wherein the platinum and the palladium components are present in a platinum to palladium (Pt/Pd) ratio of greater than about 1 to 1, and wherein the ammonia generating and hydrocarbon oxidation catalyst is substantially free of ceria and substantially free of $NO_x$ storage components; a three-way conversion (TWC) catalyst downstream of the ammonia generating and hydrocarbon oxidation catalyst; and an ammonia selective catalytic reduction (SCR) catalyst downstream of the three-way conversion catalyst.

In a second embodiment, the system of the first embodiment is modified, wherein the refractory metal oxide support is selected from the group consisting of alumina, silica, titania, zirconia and combinations thereof.

In a third embodiment, the system of the first and second embodiments is modified, wherein the Pt/Pd ratio is about 2/1 to about 100/1.

In a fourth embodiment, the system of the first through third embodiments is modified, wherein the Pt/Pd ratio is about 4/1 to about 20/1.

In a fifth embodiment, the system of the first through fourth embodiments is modified, wherein the TWC catalyst is downstream of the ammonia generating and hydrocarbon oxidation catalyst.

In a sixth embodiment, the system of the first through fifth embodiments is modified, wherein the ammonia generating and hydrocarbon oxidation catalyst and the TWC catalyst are on separate substrates.

In a seventh embodiment, the system of the first through sixth embodiments is modified, wherein the ammonia generating and hydrocarbon oxidation catalyst and the TWC catalyst are on a single substrate.

In an eighth embodiment, the system of the first through seventh embodiments is modified, wherein the SCR catalyst comprises one or more of a molecular sieve material and a mixed oxide.

In a ninth embodiment, the system of the eighth embodiment is modified, wherein the molecular sieve material has a double six-ring (d6r) unit.

In a tenth embodiment, the system of the sixth and seventh embodiments is modified, wherein the molecular sieve material has a framework type selected from the group consisting of AEI, CHA, and AFX.

In an eleventh embodiment, the system of the sixth through tenth embodiments is modified, wherein the molecular sieve material has the CHA framework type.

In twelfth embodiment, the system of the sixth through eleventh embodiments is modified, wherein the molecular sieve material has a silica to alumina ratio of about 2 to about 100.

In a thirteenth embodiment, the system of the sixth through twelfth embodiments is modified, wherein the molecular sieve material is promoted with a metal selected from the group consisting of Cu, Fe, Co, Ni, La, Ce, Mn, V, Ag, and combinations thereof.

In a fourteenth embodiment, the system of the first through thirteenth embodiments is modified, wherein the SCR catalyst is disposed on a wall-flow filter.

In a fifteenth embodiment, the system of the first through thirteenth embodiments is modified, wherein the SCR catalyst is disposed on a flow-through substrate.

In a sixteenth embodiment, the system of the first through fifteenth embodiments is modified, wherein a wall flow filter is disposed upstream from the SCR catalyst, the wall flow filter having the three-way conversion (TWC) catalyst thereon.

In a seventeenth embodiment, the system of the first through sixteenth embodiments is modified, wherein a wall flow filter is disposed upstream from the SCR catalyst, the wall flow filter having the ammonia generating and hydrocarbon oxidation catalyst thereon.

In an eighteenth embodiment, the system of the first through seventeenth embodiments is modified, further comprising an ammonia oxidation catalyst downstream of the SCR catalyst.

In a nineteenth embodiment, the system of the first through eighteenth embodiments is modified, wherein the TWC catalyst comprises one or more of a platinum group metal, an oxygen storage component, and a refractory metal oxide support.

A second aspect of the invention is directed to an exhaust gas treatment system. In an twentieth embodiment, an exhaust gas treatment system comprises: an ammonia generating and hydrocarbon oxidation catalyst that is substantially free of ceria and substantially free of $NO_x$ storage components, wherein the ammonia generating and hydrocarbon oxidation catalyst comprises a refractory metal oxide support, a platinum component, and a palladium component, wherein the platinum component and the palladium components are present in a platinum to palladium ratio of greater than about 2 to 1; a three-way conversion (TWC) catalyst; and an ammonia selective catalytic reduction (SCR) catalyst comprising a molecular sieve material having a double six-ring (d6r) unit downstream of the ammonia generating and hydrocarbon oxidation catalyst and the TWC catalyst.

In a twenty-first embodiment, the exhaust gas treatment system of the twentieth embodiment is modified, wherein the TWC catalyst is downstream from the ammonia generating and hydrocarbon oxidation catalyst.

A third aspect of the invention is directed to a method of treating an engine exhaust gas stream from a gasoline engine. In a twenty-second embodiment, a method of treating an engine exhaust gas stream from a gasoline engine comprises: flowing the engine exhaust gas stream over an ammonia generating and hydrocarbon oxidation catalyst; and directing the exhaust gas stream through a three-way conversion (TWC) catalyst downstream from the ammonia generating and hydrocarbon oxidation catalyst and a selective catalytic reduction (SCR) catalyst downstream from the TWC catalyst, wherein the ammonia generating and hydrocarbon catalyst is substantially free of ceria and substantially free of $NO_x$ storage components, wherein the ammonia generating and hydrocarbon catalyst comprises a refractory metal oxide support, a platinum component, and a palladium component, and wherein the platinum component and the palladium component are present in a platinum to palladium ratio of greater than about 1 to 1.

DETAILED DESCRIPTION OF THE INVENTION

Before describing several exemplary embodiments of the invention, it is to be understood that the invention is not limited to the details of construction or process steps set forth in the following description. The invention is capable of other embodiments and of being practiced or being carried out in various ways.

Figure 1:
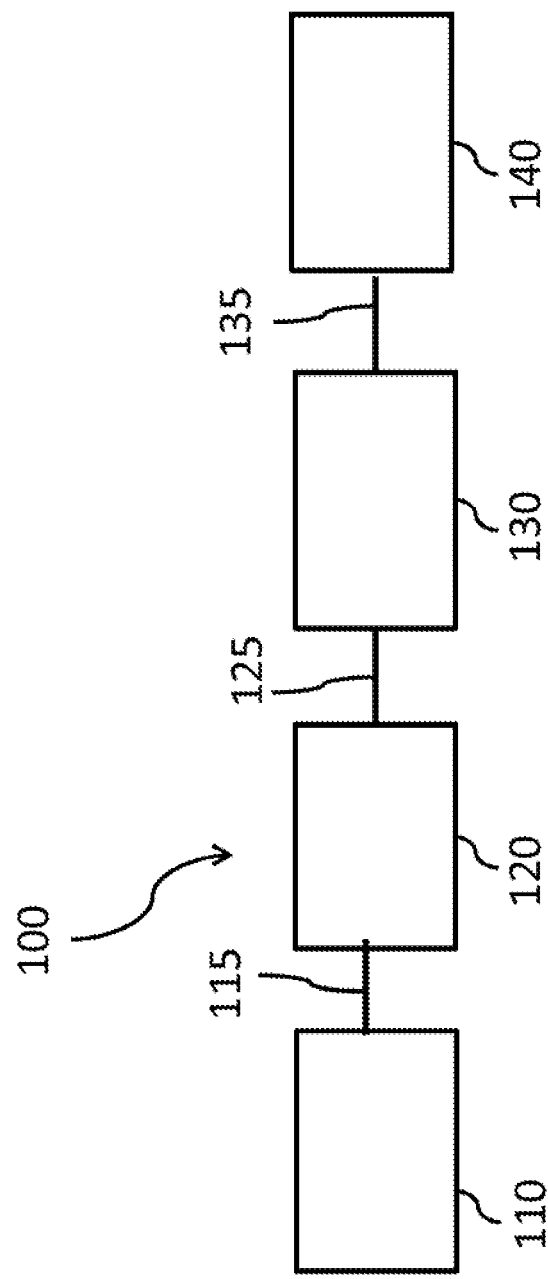
FIG. 1 is a diagram of an exhaust gas system configuration used in gasoline engines according to one or more embodiments.

FIG. 1 shows an engine exhaust system configuration used in gasoline engines according to one or more embodiments. Specifically, FIG. 1 shows an engine exhaust system 100 comprising an ammonia generating and hydrocarbon oxidation catalyst 120 downstream from a gasoline engine 110 via an exhaust conduit 115, a three-way conversion (TWC) catalyst 130 downstream from the ammonia generating and hydrocarbon oxidation catalyst 120 via an exhaust conduit 125, and a SCR catalytic article 140 downstream from the TWC catalyst 130 via an exhaust conduit 135.

Exhaust gas from vehicles powered by gasoline engines is typically treated with one or more TWC catalysts, which are effective to abate $NO_x$, carbon monoxide (CO), and hydrocarbon (HC) pollutants in the exhaust of engines operated at or near stoichiometric air/fuel conditions. To improve fuel-economy, however, gasoline-fueled engine are being designed to operate under lean conditions. Under lean conditions, temperatures are generally 250° C. and lower, and use of a TWC catalyst results in HC breakthrough (i.e. catalyst failure), even with very high amounts of Pd. Accordingly, there is a need to oxidize hydrocarbons at very low temperatures (e.g., 250° C.). Initially, it was thought that very high catalyst loading was required to oxidize hydrocarbons at low temperature under lean conditions. It was surprisingly found that use of an ammonia generating and hydrocarbon oxidation catalyst that is substantially free of ceria and substantially free of $NO_x$ storage components shows high conversion efficiency of hydrocarbons in lean conditions at low temperature and high conversion efficiency of $NO_x$ to $NH_3$ in rich operation.

Thus, according to embodiments of the invention, provided is an exhaust gas system for treatment of a gasoline engine exhaust gas stream comprising: an ammonia generating and hydrocarbon oxidation catalyst comprising a refractory metal oxide support, a platinum component, and a palladium component, wherein the platinum component and the palladium component are present in a platinum to palladium ratio of greater than about 1 to 1, and wherein the ammonia generating and hydrocarbon oxidation catalyst is substantially free of ceria and substantially free of $NO_x$ storage components; a three-way conversion (TWC) catalyst; and an ammonia selective catalytic reduction (SCR) catalyst downstream of the three-way conversion catalyst.

With respect to the terms used in this disclosure, the following definitions are provided.

As used herein, the terms "catalyst" or "catalyst material" or "catalytic material" refer to a material that promotes a reaction.

As used herein, the term "catalytic article" refers to an element that is used to promote a desired reaction. For example, a catalytic article may comprise a washcoat containing a catalytic species, e.g., a catalyst composition, on a substrate, e.g., a honeycomb substrate.

As used herein, the terms "layer" and "layered" refer to a structure that is supported on a surface, e.g. a substrate.

As used herein, the term "gasoline engine" refers to any internal combustion engine with spark-ignition designed to run on gasoline. In one or more specific embodiments, the engine is a lean gasoline direct injection engine. Gasoline direct injection (GDI) engines can have lean burn conditions and stratified combustion, resulting in the generation of particulates. In contrast to particulates generated by diesel lean burn engines, the particulates generated by GDI engines tend to be finer and in lesser quantities.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried, and calcined to provide the porous washcoat.

As used herein, the term "stream" broadly refers to any combination of flowing gas that may contain solid or liquid particulate matter. The term "gaseous stream" or "exhaust gas stream" means a stream of gaseous constituents, such as the exhaust of an engine, which may contain entrained non-gaseous components such as liquid droplets, solid particulates, and the like. The exhaust gas stream of an engine typically further comprises combustion products, products of incomplete combustion, oxides of nitrogen, combustible and/or carbonaceous particulate matter (soot), and un-reacted oxygen and nitrogen.

Ammonia Generating and Hydrocarbon Oxidation Catalyst:

In one or more embodiments, the ammonia generating and hydrocarbon oxidation catalyst comprises a refractory metal oxide support, a platinum component, and a palladium component, wherein the platinum component and the palladium component are present in a platinum to palladium ratio of greater than about 1 to 1, and wherein the ammonia generating and hydrocarbon oxidation catalyst is substantially free of ceria and substantially free of $NO_x$ storage components.

As used herein, the terms "refractory metal oxide support" and "support" refer to underlying high surface area material upon which additional chemical compounds or elements are carried. The support particles have pores larger than 20 Å and a wide pore distribution. As defined herein, such supports, e.g., metal oxide supports, exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa, and theta alumina phases. Refractory metal oxides other than activated alumina can be used as a support for at least some of the catalytic components in a given catalyst. For example, bulk ceria, zirconia, alpha alumina, silica, titania, and other materials are known for such use.

One or more embodiments of the present invention include a refractory metal oxide support comprising an activated compound selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, and combinations thereof. Although many of these materials suffer from the disadvantage of having a considerably lower BET surface area than activated alumina, that disadvantage tends to be offset by a greater durability or performance enhancement of the resulting catalyst. As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

In one or more embodiments, the refractory metal oxide supports independently comprise a compound that is activated, stabilized, or both, selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, and combinations thereof. It is noted that when the refractory metal oxide support is stabilized with ceria, the ceria stabilizer is present in an amount less than 1 wt. %, based on the weight of the ammonia generating and hydrocarbon oxidation catalyst. In one or more embodiments, the refractory metal oxide support comprises less than 1 wt. % of a ceria stabilizer, including less than 0.75 wt. %, less than 0.5 wt. %, less than 0.25 wt. %, and less than 0.1 wt. %. In one or more specific embodiments, the refractory metal oxide support comprises alumina.

As used herein, the term "oxygen storage component" (OSC) refers to an entity that has a multi-valence state and can actively react with reductants such as carbon monoxide (CO) or hydrogen under reduction conditions and then react with oxidants such as oxygen or nitrogen oxides under oxidative conditions. Examples of oxygen storage components include rare earth oxides, particularly ceria, lanthana, praseodymia, neodymia, niobia, europia, samaria, ytterbia, yttria, zirconia, and mixtures thereof in addition to ceria.

According to one or more embodiments, the ammonia generating and hydrocarbon oxidation catalyst is substantially free of ceria. As used herein, the term "substantially free of ceria" means that there is generally less than about 1 wt. %, including less than about 0.75 wt. %, less than about 0.5 wt. %, less than about 0.25 wt. %, or less than about 0.1 wt. %, of ceria in the ammonia generating and hydrocarbon oxidation catalyst. In some embodiments, no ceria has been intentionally added to the ammonia generating and hydrocarbon oxidation catalyst. In some embodiments, "substantially free of ceria" includes "free of ceria." It will be appreciated by one of skill in the art, however, that during loading/coating, trace amounts of ceria may migrate from one washcoat component to another, such that trace amounts of ceria can be present in the ammonia generating and hydrocarbon oxidation catalyst.

As used herein, the term "$NO_x$ storage component" refers to alkaline earth metal oxides or carbonates, such as oxides or carbonates of Mg, Ca, Sr, and Ba, and alkali metal oxides or carbonates such as oxides or carbonates of Li, Na, K, Rb, and Cs. More specifically, the term "$NO_x$ storage component" refers to an oxide or carbonate of one or more of cesium, barium, magnesium, calcium, and strontium. For $NO_x$ storage, barium oxide is usually preferred because it forms nitrates at lean engine operation and releases the nitrates relatively easily under rich conditions. Thus, in one or more embodiment, the term "$NO_x$ storage component" refers to an oxide or carbonate of barium.

According to one or more embodiments, the ammonia generating and hydrocarbon oxidation catalyst is substantially free of $NO_x$ storage components. As used herein, the term "substantially free of $NO_x$ storage components" means that there is generally less than about 5 wt. %, including less than about 2 wt. %, less than about 1 wt. %, less than about 0.75 wt. %, less than about 0.5 wt. %, less than about 0.25 wt. %, and less than about 0.1 wt. %, of a $NO_x$ storage component in the ammonia generating and hydrocarbon oxidation catalyst. In some embodiments, no $NO_x$ storage components have been intentionally added to the ammonia generating and hydrocarbon oxidation catalyst. In some embodiments, "substantially free of $NO_x$ storage components" includes "free of $NO_x$ storage components." It will be appreciated by one of skill in the art, however, that during loading/coating trace amounts of a $NO_x$ storage component may migrate from one washcoat component to another, such that trace amounts of a $NO_x$ storage component can be present in the ammonia generating and hydrocarbon oxidation catalyst.

According to one or more embodiments, the ammonia generating and hydrocarbon oxidation catalyst is substantially free of barium. As used herein, the term "substantially free of barium" means that there is generally less than about 5 wt. %, including less than about 2 wt. %, less than about 1 wt. %, less than about 0.75 wt. %, less than about 0.5 wt. %, less than about 0.25 wt. %, or less than about 0.1 wt. %, of barium in the ammonia generating and hydrocarbon oxidation catalyst. In some embodiments, no barium has been intentionally added to the ammonia generating and hydrocarbon oxidation catalyst. In some embodiments, "substantially free of barium" includes "free of barium." It will be appreciated by one of skill in the art, however, that during loading/coating trace amounts of barium may migrate from one washcoat component to another, such that trace amounts of barium can be present in the ammonia generating and hydrocarbon oxidation catalyst.

As used herein, the term "platinum group metal" or "PGM" refers to one or more chemical elements defined in the Periodic Table of Elements, including platinum (Pt), palladium, rhodium, osmium, iridium, and ruthenium, and mixtures thereof.

As used herein, "platinum group metal component," "platinum component," "rhodium component," "palladium component, "iridium component" and the like refers the respective platinum group metal compound, complex, or the like which, upon calcination or use of the catalyst decomposes or otherwise converts to a catalytically active form, usually, the metal or the metal oxide.

In one or more embodiments, the ammonia generating and hydrocarbon oxidation catalyst comprises a platinum component and a palladium component supported on the refractory metal oxide support. Initially, it was thought that very high loadings of PGM were required, particularly loadings of PGM exceeding 200 g/ft$^3$, 250 g/ft$^3$, or 275 g/ft$^3$ in order to convert hydrocarbons at low temperatures. Surprisingly, however, it was found that very high PGM loadings are not necessary. In one or more embodiments, the total PGM loading is in the range of about 50 g/ft$^3$ to about 400 g/ft$^3$, including about 50 g/ft$^3$ to about 300 g/ft$^3$, about 50 g/ft$^3$ to about 250 g/ft$^3$, about 50 g/ft$^3$ to about 150 g/ft$^3$, about 50 g/ft$^3$ to about 100 g/ft$^3$, and about 50 g/ft$^3$ to about 75 g/ft$^3$. In one or more specific embodiments, the total PGM loading is about 250 g/ft$^3$ to about 300 g/ft$^3$ (e.g., about 270 g/ft$^3$), about 175 g/ft$^3$ to about 200 g/ft$^3$ (e.g., about 198 g/ft$^3$), about 125 g/ft$^3$ to about 150 g/ft$^3$ (e.g., about 132 g/ft$^3$), and about 100 g/ft$^3$ to about 125 g/ft$^3$ (e.g., about 120 g/ft$^3$).

Generally, there are no specific restrictions as far as the palladium and platinum content of the ammonia generating and hydrocarbon oxidation catalyst is concerned. In one or more embodiments the platinum loading is in the range of about 1 g/ft$^3$ to about 300 g/ft$^3$, including about 10 g/ft$^3$ to about 300 g/ft$^3$, and about 10 g/ft$^3$ to about 100 g/ft$^3$, and the palladium loading is in the range of 0 g/ft$^3$ to about 150 g/ft$^3$, including about 1 g/ft$^3$ to about 100 g/ft$^3$, and 0 to about 30 g/ft$^3$.

According to one or more embodiments, the platinum component and palladium component are present in a platinum to palladium ratio of greater than 1 to 1. In some embodiments, there is no palladium present. As will be appreciated by one skilled in the art, the platinum and/or palladium can be in an alloy form. In one or more embodiments, the Pt/Pd ratio is in the range of about 2/1 to about 100/1, including the ranges of about 2/1 to about 50/1, about 2/1 to about 25/1, about 2/1 to about 20/1, about 3/1 to about 100/1, about 3/1 to about 50/1, about 3/1 to about 25/1, about 3/1 to about 20/1, about 4/1 to about 100/1, about 4/1 to about 50/1, about 4/1 to about 25/1, about 4/1 to about 20/1, about 5/1 to about 100/1, about 5/1 to about 50/1, about 5/1 to about 25/1, about 5/1 to about 20/1, about 6/1 to about 100/1, about 6/1 to about 50/1, about 6/1 to about 25/1, about 7/1 to about 100/1, about 7/1 to about 50/1, about 7/1 to about 25/1, about 8/1 to about 100/1, about 8/1 to about 50/1, about 8/1 to about 25/1, about 9/1 to about 100/1, about 9/1 to about 50/1, about 9/1 to about 25/1, about 10/1 to about 100/1, about 10/1 to about 50/1, and about 10/1 to about 25/1.

TWC Catalyst:

In one or more embodiments, the ammonia generating and hydrocarbon oxidation catalyst is upstream of a three-way conversion (TWC) catalyst. In other embodiments, the ammonia generating and hydrocarbon oxidation catalyst is downstream of a three-way conversion (TWC) catalyst. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. When a catalyst or catalyst zone is "downstream" or "upstream" from another catalyst or zone, it may be on a different substrate or brick or on a different region of the same substrate or brick. In one or more embodiments, there is one or more additional catalytic materials located between the ammonia generating and hydrocarbon oxidation catalyst and the TWC catalyst. In other embodiments, the ammonia generating and hydrocarbon oxidation catalyst is immediately upstream of the TWC catalyst. As used herein, the term "immediately upstream" refers to the relative direction according to the flow of an engine exhaust gas stream from an engine towards a tailpipe and means that there is no other catalytic material between the ammonia generating and hydrocarbon oxidation catalyst and the TWC catalyst.

In one or more embodiments, there are no specific requirements with respect to the TWC catalyst; any TWC catalyst known in the art can be utilized. In one or more embodiments, the TWC catalyst comprises a platinum group metal supported on an oxygen storage component and/or a refractory metal oxide support, and, optionally, an additional platinum group metal component supported on a second refractory metal oxide support or a second oxygen storage component.

Examples of suitable oxygen storage components for the TWC catalyst comprise the rare earth oxides, particularly ceria. The OSC can also comprise one or more of lanthana, praseodymia, neodymia, niobia, europia, samaria, ytterbia, yttria, zirconia, and mixtures thereof in addition to ceria. The rare earth oxide may be in bulk (e.g. particulate) form. The oxygen storage component can include cerium oxide (ceria, $CeO_2$) in a form that exhibits oxygen storage properties. The lattice oxygen of ceria can react with carbon monoxide, hydrogen, or hydrocarbons under rich A/F conditions. In one or more embodiments, the oxygen storage component for the TWC catalyst comprises a ceria-zirconia composite or a rare earth-stabilized ceria-zirconia.

In one or more embodiments, the refractory metal oxide supports for the TWC catalyst independently comprise a compound that is activated, stabilized, or both, selected from the group consisting of alumina, zirconia, alumina-zirconia, lanthana-alumina, lanthana-zirconia-alumina, alumina-chromia, ceria, alumina-ceria, and combinations thereof.

In one or more embodiments, the platinum group metal component of the TWC catalyst is selected from platinum, palladium, rhodium, or mixtures thereof. In specific embodiments, the platinum group metal component of the TWC catalyst comprises palladium. Generally, there are no specific restrictions as far as the palladium content of the TWC catalyst is concerned.

In one or more embodiments, the TWC catalyst does not comprise an additional platinum group metal (i.e., the TWC comprises only one platinum group metal). In other embodiments, the TWC catalyst comprises an additional platinum group metal. In one or more embodiments, when present, the additional platinum group metal is selected from platinum, rhodium, and mixtures thereof. In specific embodiments, the additional platinum group metal component comprises rhodium. Generally there are no specific restrictions as far as the rhodium content of the TWC catalyst is concerned. In one or more specific embodiments, the TWC catalyst comprises a mixture of palladium and rhodium. In other embodiments, the TWC catalyst comprises a mixture of platinum, palladium, and rhodium.

SCR Catalyst:

In one or more embodiments, the ammonia generating and hydrocarbon oxidation catalyst is upstream of a selective-catalytic reduction (SCR) catalyst. In other embodiments, the ammonia generating and hydrocarbon oxidation catalyst is upstream of a TWC catalyst and upstream of a selective-catalytic reduction (SCR) catalyst. In one or more embodiments there is one or more additional catalytic materials located between the TWC catalyst and the SCR catalyst. In other embodiments, the TWC catalyst is immediately upstream of the SCR catalyst. As used herein, the term "immediately upstream" refers to the relative direction according to the flow of an engine exhaust gas stream from an engine towards a tailpipe. Immediately upstream means that there is no other catalytic material between the TWC catalyst and the SCR catalyst.

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" and "$NO_x$" designate the oxides of nitrogen.

The SCR catalyst can be a mixed oxide, a molecular sieve or combinations thereof. As used herein, the term "mixed oxide" refers to an oxide that contains cations of more than one chemical element or cations of a single element in several states of oxidation. In one or more embodiments, the mixed oxide is selected from Fe/titania (e.g. $FeTiO_3$), Fe/alumina (e.g. $FeAl_2O_3$), Mg/titania (e.g. $MgTiO_3$), Mg/alumina (e.g. $MgAl_2O_3$), Mn/alumina, Mn/titania (e.g. $MnO_x/TiO_2$) (e.g. $MnO_x/Al_2O_3$), Cu/titania (e.g. $CuTiO_3$), Ce/Zr (e.g. $CeZrO_2$), Ti/Zr (e.g. $TiZrO_2$), vanadia/titania (e.g. $V_2O_5/TiO_2$), and mixtures thereof. In specific embodiments, the mixed oxide comprises vanadia/titania. The vanadia/titania oxide can be activated or stabilized with tungsten (e.g., $WO_3$) to provide $V_2O_5/TiO_2/WO_3$.

As used herein, the phrase "molecular sieve" refers to framework materials such as zeolites and other framework materials (e.g., isomorphously substituted materials), which may in particulate form in combination with one or more promoter metals be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, including silicon and aluminum atoms. According to one or more embodiments, it will be appreciated that by defining the molecular sieves by their framework type, it is intended to include the framework type and any and all isotypic framework materials such as SAPO, ALPO and MeAPO materials having the same framework type as the zeolite materials.

In more specific embodiments, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. Zeolites are crystalline materials having rather uniform pore sizes which, depending upon the type of zeolite and the type and amount of cations included in the zeolite lattice, range from about 3 to about 10 Angstroms in diameter. Zeolites generally comprise silica to alumina (SAR) molar ratios of 2 or greater.

The term "aluminophosphates" refers to another specific example of a molecular sieve, including aluminum and phosphate atoms. Aluminophosphates are crystalline materials having rather uniform pore sizes.

Generally, molecular sieves, e.g., zeolites, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In one or more embodiments, the molecular sieve materials, independently comprise $SiO_4/AlO_4$ tetrahedra and are linked by common oxygen atoms to form a three-dimensional network. In other embodiments, the molecular sieve materials comprise $SiO_4/AlO_4/PO_4$ tetrahedra. The molecular sieve materials of one or more embodiments can be differentiated mainly according to the geometry of the voids which are formed by the rigid network of the $(SiO_4)/AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the molecular sieve materials comprise ring sizes of no larger than 12, including 6, 8, 10, and 12.

According to one or more embodiments, the molecular sieve materials can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve materials comprise an 8-ring small pore aluminosilicate zeolite. As used herein, the term "small pore" refers to pore openings, which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic framework types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve materials comprise a d6r unit. Thus, in one or more embodiments, the molecular sieve materials have a framework type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the molecular sieve materials have a framework type selected from the group consisting of CHA, AEI, AFX, ERI, KFI, LEV, and combinations thereof. In still further specific embodiments, the molecular sieve materials have a framework type selected from CHA, AEI, and AFX. In one or more very specific embodiments, the molecular sieve materials have the CHA framework type.

Zeolitic CHA-framework type molecular sieves includes a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic CHA framework type, SSZ-13, is described in U.S. Pat. No. 4,544,538, which is hereby incorporated by reference. Synthesis of a synthetic form of a molecular sieve having the CHA framework type, silicoaluminophosphate 34 (SAPO-34), is described in U.S. Pat. Nos. 4,440,871 and 7,264,789, which are hereby incorporated by reference. A method of making yet another synthetic molecular sieve having the CHA framework type, SAPO-44, is described in U.S. Pat. No. 6,162,415, which is hereby incorporated by reference.

In one or more embodiments, the molecular sieve materials can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, and CuSAPO-47.

The ratio of silica to alumina of an aluminosilicate molecular sieve component can vary over a wide range. In one or more embodiments, the molecular sieve materials, have a silica to alumina molar ratio (SAR) in the range of 2 to 300, including 5 to 250; 5 to 200; 5 to 100; and 5 to 50. In one or more specific embodiments, the molecular sieve materials, have a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

As used herein, the term "promoted" refers to a component that is intentionally added to the molecular sieve material, as opposed to impurities inherent in the molecular sieve. Thus, a promoter is intentionally added to enhance activity of a catalyst compared to a catalyst that does not have promoter intentionally added. In order to promote the SCR of oxides of nitrogen, in one or more embodiments, suitable metal(s) is independently exchanged into the molecular sieve. According to one or more embodiments, the molecular sieve is promoted with one or more of copper (Cu), iron (Fe), cobalt (Co), nickel (Ni), lanthanum (La), cerium (Ce), manganese (Mn), vanadium (V), or silver (Ag). In specific embodiments, the molecular sieve is promoted with one or more of copper (Cu) or iron (Fe). In very specific embodiments, the molecular sieve is promoted with Cu.

The promoter metal content of the catalyst, calculated as the oxide, is, in one or more embodiments, at least about 0.1 wt. %, reported on a volatile-free basis. In specific embodiments, the promoter metal content, calculated as the oxide, is in the range of 0.1 wt. % up to about 10 wt. %, including 9, 8, 7, 6, 5, 4, 3, 2, 1, 0.5, 0.25, and 0.1 wt. %, in each case based on the total weight of the calcined molecular sieve reported on a volatile free basis.

In specific embodiments, the promoter metal comprises Cu, and the Cu content, calculated as CuO is in the range of about 0.1 wt. % up to about 5 wt. %, including about 5, about 4, about 3, about 2, about 1, about 0.5, about 0.25, and about 0.1 wt. %, in each case based on the total weight of the calcined molecular sieve reported on a volatile free basis. In specific embodiments, the Cu content of the molecular sieve, calculated as CuO, is in the range of about 2 to about 5 wt. %.

In one or more embodiments, the exhaust gas treatment system further comprises an ammonia oxidation (AMOx) catalyst downstream of the SCR catalyst. The ammonia oxidation catalyst may be provided downstream of the SCR catalyst to remove any slipped ammonia from upstream components of the exhaust gas treatment system. In one or more embodiments, the SCR catalyst is on a substrate having an inlet and an outlet, and includes an ammonia oxidation (AMOx) catalyst at the outlet. In specific embodiments, the AMOx catalyst may comprise a platinum group metal such as platinum, palladium, rhodium, or combinations thereof. In one or more embodiments, the AMOx catalyst may comprise a bottom coat with one or more PGM components and a top coat with SCR functionality.

Such AMOx catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. Thus, the first catalyst can be the SCR catalyst, and the second catalyst can be an AMOx catalyst and/or SCR+AMOx integrated catalyst, optionally comprising a zeolite.

AMOx catalyst composition(s) can be coated on a flow through substrate or wall-flow filter substrate. If a wall flow filter substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow filter substrate will depend on substrate properties such as porosity and wall thickness, and typically will be lower than loading on a flow through substrate.

Substrate:

In one or more embodiments, the ammonia generating and hydrocarbon oxidation catalyst, the TWC catalyst, and the SCR catalyst are located on separate substrates. As used herein, the term "substrate" refers to the monolithic material onto which the catalyst material is placed, typically in the form of a washcoat. A washcoat is formed by preparing a slurry containing a specified solids content (e.g., 30-90% by weight) of catalyst in a liquid, which is then coated onto a substrate and dried to provide a washcoat layer. As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

In one or more embodiments, the substrate is selected from one or more of a flow-through honeycomb monolith, or a particulate filter, and the catalytic material(s) are applied to the substrate as a washcoat.

In one or more embodiments, the substrate is a ceramic or metal substrate having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

A metallic substrate may include any metallic substrate, such as those with openings or "punch-outs" in the channel walls. A ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst materials of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

In one or more embodiments in which the substrate is a particulate filter, the particulate filter can be selected from a gasoline particulate filter and a soot filter. As used herein, the terms "particulate filter" and "soot filter" refer to a filter designed to remove particulate matter from an exhaust gas stream such as soot. Particulate filters include, but are not limited to honeycomb wall flow filters, partial filtration filter, wire mesh filters, wound fiber filters, sintered metal filters, and foam filters.

In a specific embodiment, the particulate filter is a catalyzed soot filter (CSF). The catalyzed CSF comprises a substrate coated with a washcoat layer containing a platinum group metal for burning off trapped soot and/or oxidizing NO to $NO_2$. The catalyzed CSF is coated with a platinum group metal and one or more high surface area refractory metal oxide supports (e.g., alumina, silica, silica alumina, zirconia, zirconia alumina, and ceria-zirconia) for the combustion of unburned hydrocarbons and, to some degree, particulate matter.

Wall flow substrates useful for supporting the catalyst material of one or more embodiments have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention can be catalyzed in that the wall of said element has thereon or contained therein a platinum group metal. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

Figure 2:
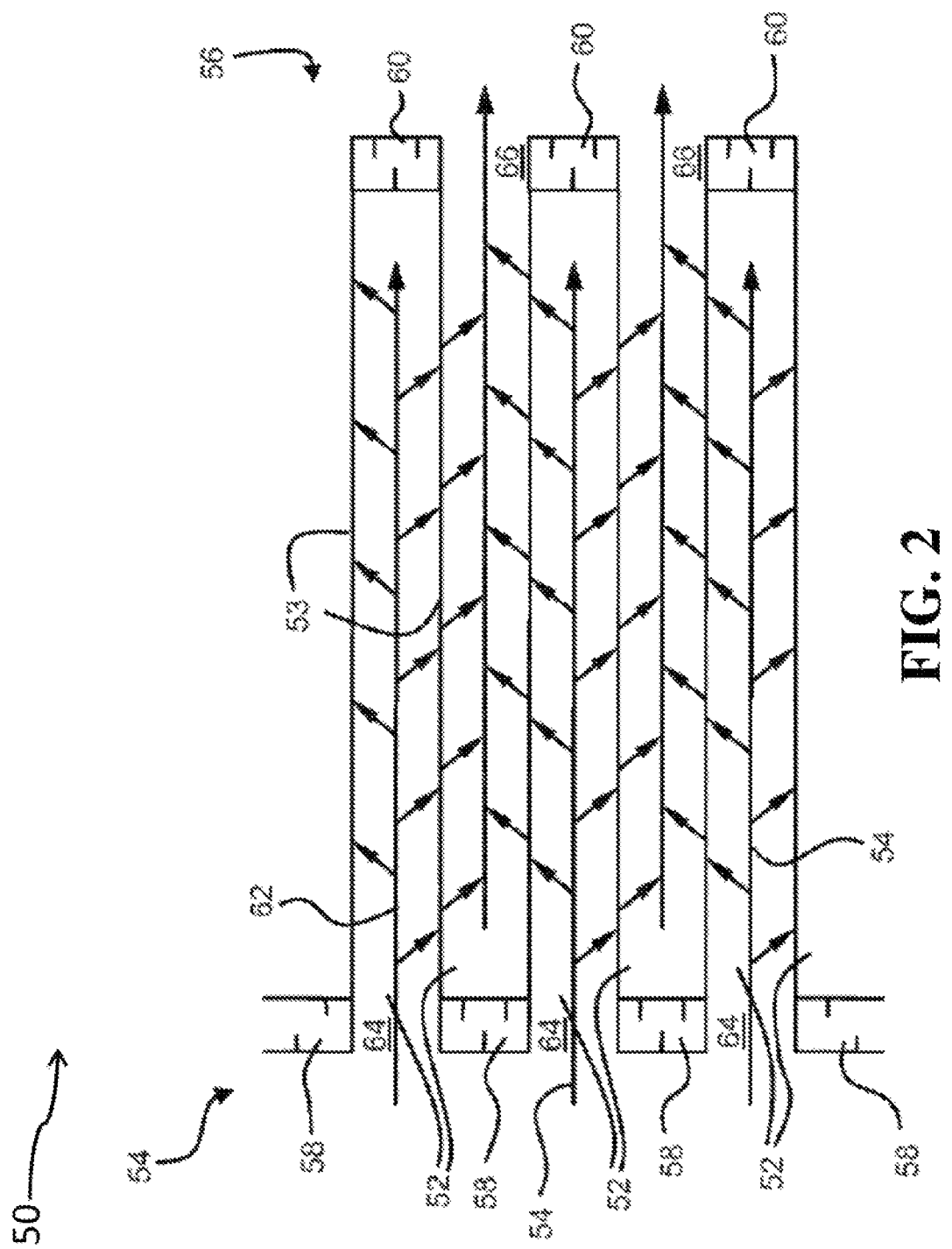
FIG. 2 shows a cross-sectional view of a section of a wall flow filter substrate.

FIG. 2 illustrates a wall flow filter substrate 50 which has a plurality of passages 52. The passages are tubularly enclosed by the channel walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet end 54 and outlet end 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

In one or more embodiments, the ammonia generating and hydrocarbon oxidation catalyst, the TWC catalyst, and the SCR catalyst are located on separate substrates. For example, in such embodiments, the ammonia generating and hydrocarbon oxidation catalyst can be located on a flow through substrate, the TWC catalyst can be located on a second and separate flow through substrate, and the SCR catalyst can be located on a third and separate flow through substrate. In other embodiments, the ammonia generating and hydrocarbon oxidation catalyst can be located on a flow through substrate, the TWC catalyst can be located on a second and separate flow through substrate, and the SCR catalyst can be located on a wall flow filter (i.e. SCR on a filter). In still further embodiments, the ammonia generating and hydrocarbon oxidation catalyst can be located on a particulate filter, the TWC catalyst can be located on a flow through substrate, and the SCR catalyst can be located on a second and separate flow through substrate. In one or more embodiments, the TWC catalyst can be located on a particulate filter.

In one or more embodiments, the SCR catalyst is disposed on a wall-flow filter. In other embodiments, the SCR catalyst is disposed on a flow-through substrate.

Figure 3:
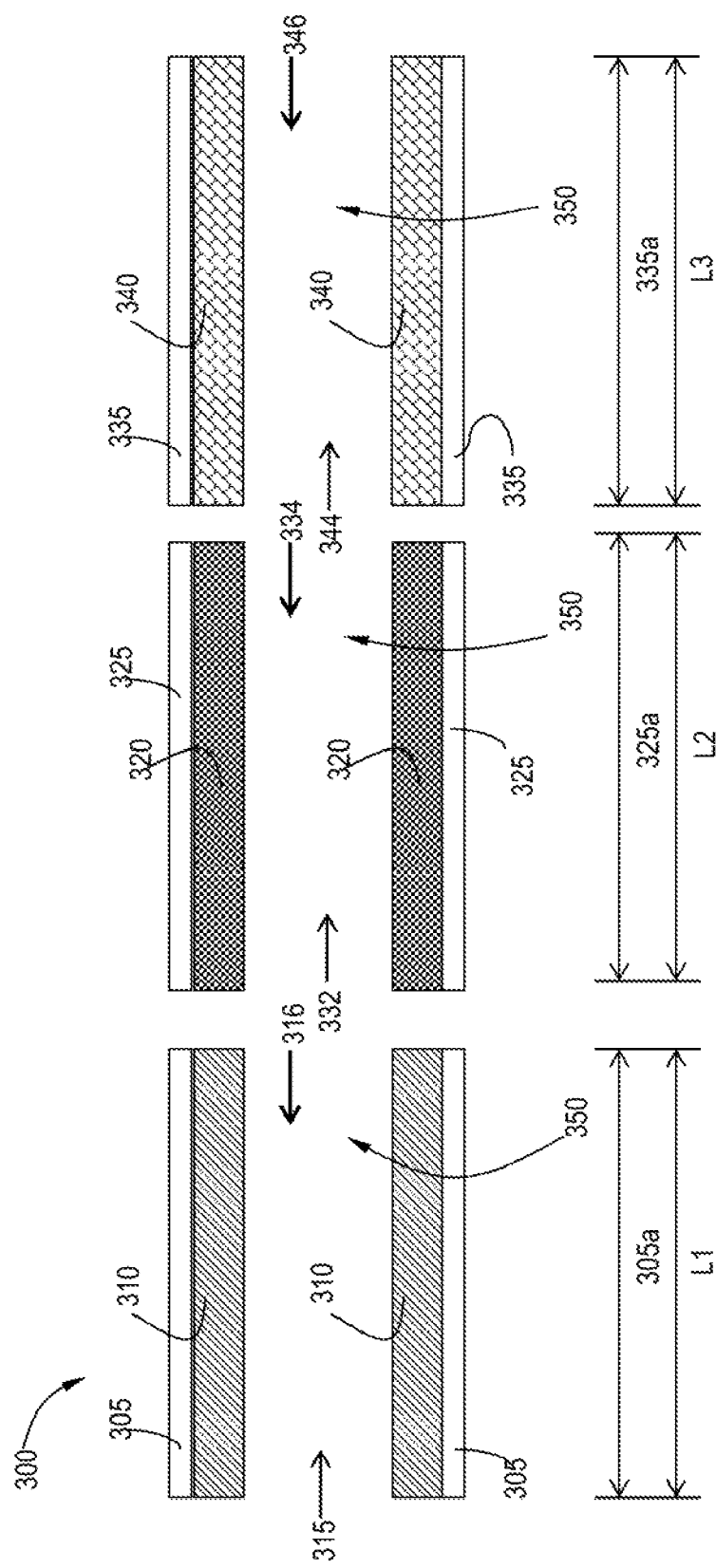
FIG. 3 shows a partial cross-sectional view of catalytic article system according to one or more embodiments.

Embodiments where the ammonia generating and hydrocarbon oxidation catalyst, the TWC catalyst, and the SCR catalyst are on separate substrates are more specifically illustrated in FIG. 3. Referring to FIG. 3, part of the exhaust gas treatment system 300 shown is an axially zoned arrangement where the ammonia generating and hydrocarbon oxidation catalyst 310 is located upstream of the TWC catalyst 320, which is located upstream of the SCR catalyst 340 and these catalysts are on separate substrates, a first substrate 305, a second substrate 325, and a third substrate 335. The ammonia generating and hydrocarbon oxidation catalyst 310 is disposed on a first substrate 305, the TWC catalyst 320 is disposed on a separate second substrate 325, and the SCR catalyst 340 is disposed on a separate third substrate 335. The first, second, and third substrates 305, 325, and 335, respectively, can be comprised of the same material or a different material. The first substrate 305 has an inlet end 315 and an outlet end 316 defining an axial length L1. The second substrate 325 has an inlet end 332 and an outlet end 334 defining an axial length L2. The third substrate 335 has an inlet end 345 and an outlet end 346 defining an axial length L3. In one or more embodiments, the first, second, and third substrates 305, 325, and 335, respectively, generally comprise a plurality of channels 350 of a honeycomb substrate, of which only one channel is shown in cross-section for clarity. The ammonia generating and hydrocarbon oxidation catalyst 310 extends from the inlet end 315 of the first substrate 305 through the entire axial length L1 of the first substrate 305 to the outlet end 316. The length of the ammonia generating and hydrocarbon oxidation catalyst 310 is denoted as first zone length 305a in FIG. 3. The TWC catalyst 320 extends from the inlet end 332 of the second substrate 325 through the entire axial length L2 of the second substrate 325 to the outlet end 334. The SCR catalyst 340 extends from the outlet end 346 of the third substrate 335 through the entire axial length L3 of the third substrate 335 to the inlet end 344. The SCR catalyst 340 defines a third zone length 335a in FIG. 3. It will be appreciated that the zone length of substrate 305a, the zone length of second substrate 325a, and the zone length of third substrate 335a can be varied.

In one or more embodiments, the ammonia generating and hydrocarbon oxidation catalyst, the TWC catalyst, and the SCR catalyst can be located on a single substrate. On a single substrate, the designs can include zoned and layered systems.

In other embodiments, the ammonia generating and hydrocarbon oxidation catalyst and the TWC catalyst are on a first substrate, and the SCR catalyst is on a separate substrate downstream from the first substrate. In one or more embodiments, the ammonia generating and hydrocarbon oxidation catalyst is axially zoned upstream from the TWC catalyst on the same substrate, with the SCR catalyst on a separate, downstream substrate.

In one or more embodiments, the ammonia generating and hydrocarbon oxidation catalyst, the TWC catalyst, and the SCR catalyst are arranged in an axially zoned configuration on a single substrate. As used herein, the term "axially zoned" refers to the location of the upstream zone and downstream zone relative to one another. Axially means side-by-side such that the upstream zone and the downstream zone are located one beside the other. Such embodiments may be more readily understood with reference to FIGS. 4A-4F.

Figure 4A:
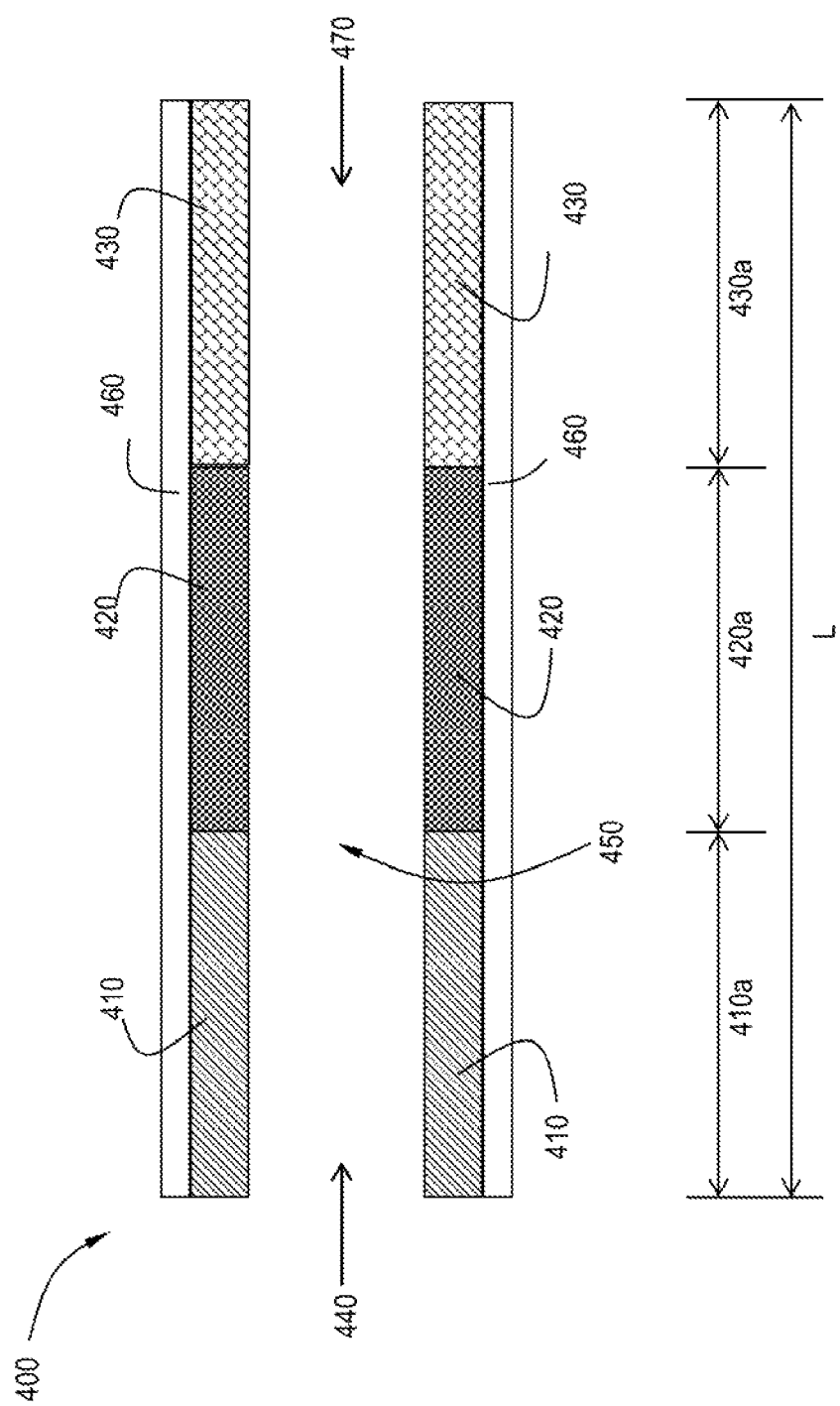
FIGS. 4A-4F show partial cross-sectional views of catalytic article systems according to one or more embodiments.

Referring to FIG. 4A, an exemplary embodiment of an axially zoned system 400 is shown. The ammonia generating and hydrocarbon oxidation catalyst 410 is located upstream of the TWC catalyst 420 which is located upstream of the SCR catalyst 430 on a common substrate 460. The substrate 460 has an inlet end 440 and an outlet end 470 defining an axial length L. In one or more embodiments, the substrate 460 generally comprises a plurality of channels 450 of a honeycomb substrate, of which only one channel is shown in cross-section for clarity. The ammonia generating and hydrocarbon oxidation catalyst 410 extends from the inlet end 440 of the substrate 460 through less than the entire axial length L of the substrate 460. The length of the ammonia generating and hydrocarbon oxidation catalyst 410 is denoted as first zone length 410a in FIG. 4. The TWC catalyst 420 extends between the ammonia generating and hydrocarbon oxidation catalyst 410 and the SCR catalyst 430 through less than the entire axial length L of the substrate 460. The length of the TWC catalyst 420 is denoted as the second zone length 420a in FIG. 4A. The SCR catalyst 430 extends from the outlet end 470 of the substrate 460 through less than the entire axial length L of the substrate 460. The length of the SCR catalyst 430 is denoted as the second zone length 430a in FIG. 4A. In one or more embodiments, as illustrated in FIG. 4A, the ammonia generating and hydrocarbon oxidation catalyst 410 is directly abutting the TWC catalyst 420, which is directly abutting the SCR catalyst 430.

Figure 4B:
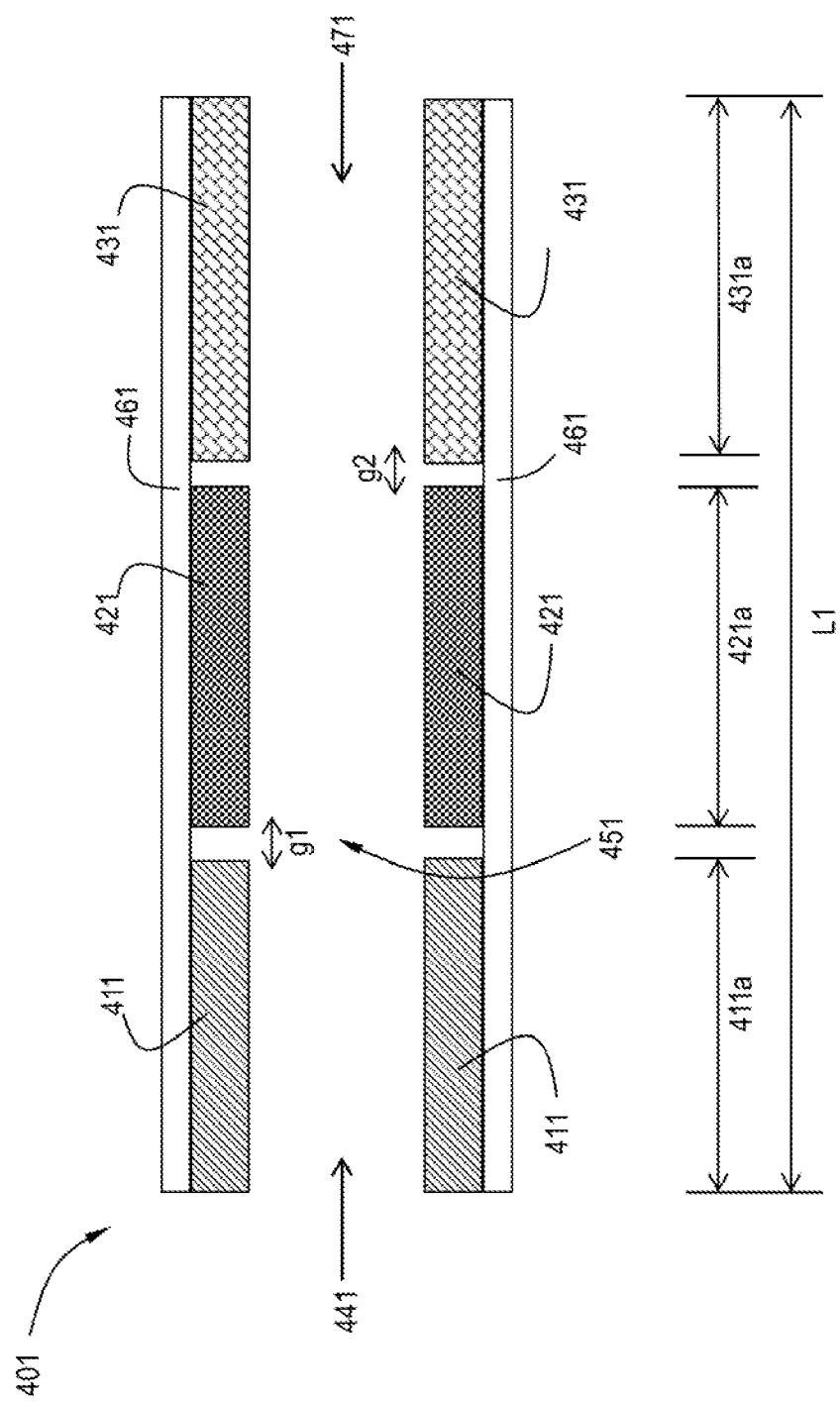

In still further embodiments, as illustrated in FIG. 4B, there are gaps (spatial gaps) between the ammonia generating and hydrocarbon oxidation catalyst, the TWC catalyst, and/or the SCR catalyst. Referring to FIG. 4B, an exemplary embodiment of an axially zoned system 401 is shown. The ammonia generating and hydrocarbon oxidation catalyst 411 is located upstream of the TWC catalyst 421 which is located upstream of the SCR catalyst 431 on a common substrate 461. The substrate 461 has an inlet end 441 and an outlet end 471 defining an axial length L1. In one or more embodiments, the substrate 461 generally comprises a plurality of channels 451 of a honeycomb substrate, of which only one channel is shown in cross-section for clarity. The ammonia generating and hydrocarbon oxidation catalyst 411 extends from the inlet end 441 of the substrate 461 through less than the entire axial length L1 of the substrate 461. The length of the ammonia generating and hydrocarbon oxidation catalyst 411 is denoted as first zone length 411a in FIG. 4B. The TWC catalyst 421 extends between the ammonia generating and hydrocarbon oxidation catalyst 411 and the SCR catalyst 431 through less than the entire axial length L1 of the substrate 461. The length of the TWC catalyst 421 is denoted as the second zone length 421a in FIG. 4B. As illustrated, there is a gap, g1, between the ammonia generating and hydrocarbon oxidation catalyst 411 and the TWC catalyst 421. The SCR catalyst 431 extends from the outlet end 471 of the substrate 461 through less than the entire axial length L1 of the substrate 461. The length of the SCR catalyst 431 is denoted as the second zone length 431a in FIG. 4A. As illustrated, there is a gap, g2, between the TWC catalyst 421 and the SCR catalyst 431.

Figure 4C:
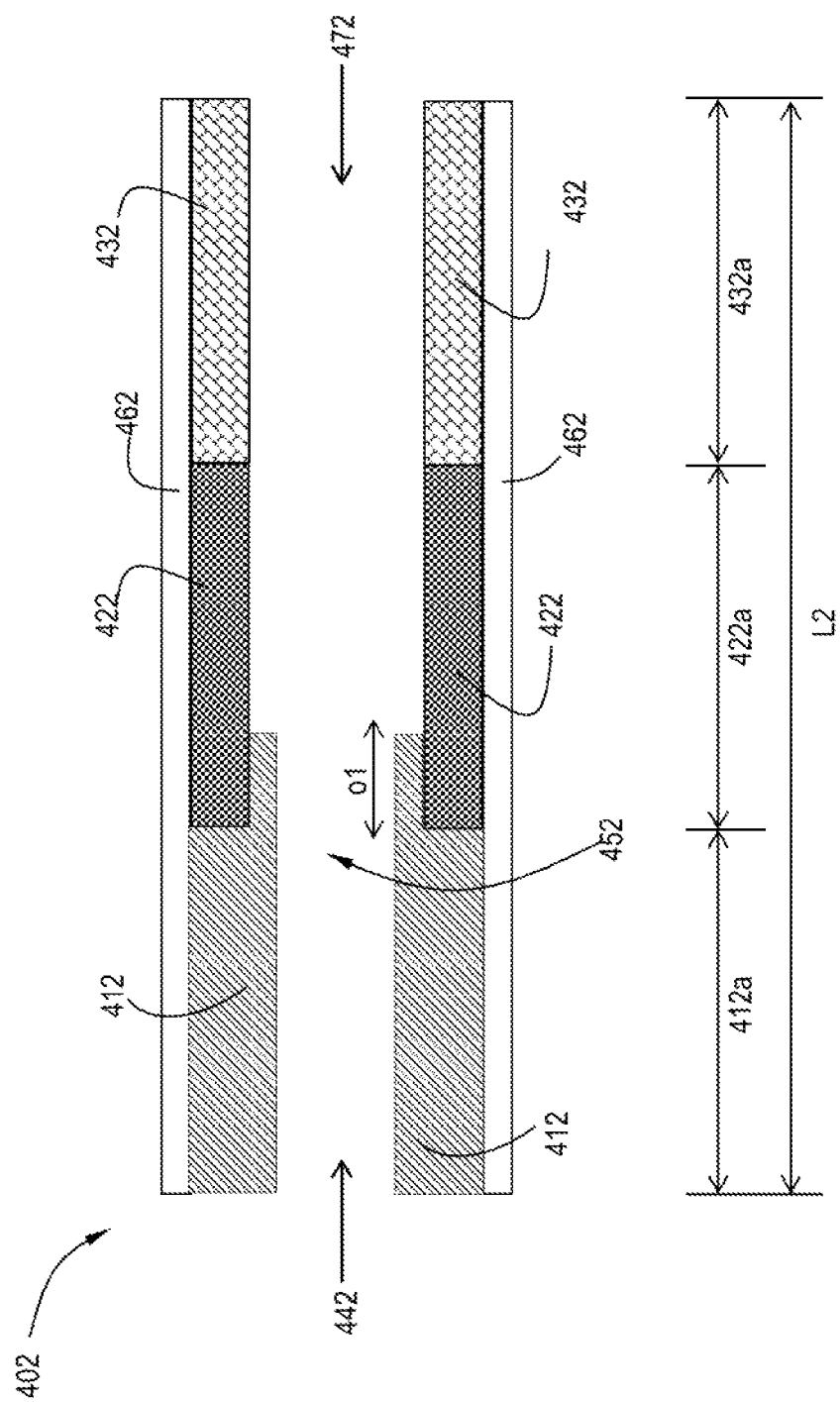

In other embodiments, as illustrated in FIGS. 4C-4F, it will be appreciated by one skilled in the art that the ammonia generating and hydrocarbon oxidation catalyst, the TWC catalyst, and/or the SCR catalyst can be at least partially overlapping. For example, as illustrated in FIG. 4C, in one or more embodiments the ammonia generating and hydrocarbon oxidation catalyst 412 is at least partially overlapping the TWC catalyst 422. More specifically, referring to FIG. 4C, an exemplary embodiment of an axially zoned system 402 is shown. The ammonia generating and hydrocarbon oxidation catalyst 412 is located upstream of the TWC catalyst 422 which is located upstream of the SCR catalyst 432 on a common substrate 462. The substrate 462 has an inlet end 442 and an outlet end 472 defining an axial length L2. In one or more embodiments, the substrate 462 generally comprises a plurality of channels 452 of a honeycomb substrate, of which only one channel is shown in cross-section for clarity. The ammonia generating and hydrocarbon oxidation catalyst 412 extends from the inlet end 442 of the substrate 462 through less than the entire axial length L2 of the substrate 462. The length of the ammonia generating and hydrocarbon oxidation catalyst 412 is denoted as first zone length 412a in FIG. 4C. The TWC catalyst 422 extends between the ammonia generating and hydrocarbon oxidation catalyst 412 and the SCR catalyst 432 through less than the entire axial length L2 of the substrate 462. The length of the TWC catalyst 422 is denoted as the second zone length 422a in FIG. 4B. As illustrated, the ammonia generating and hydrocarbon oxidation catalyst 412 is at least partially overlapping the TWC catalyst 422. The length of the overlap, o1, can vary. The SCR catalyst 432 extends from the outlet end 472 of the substrate 462 through less than the entire axial length L2 of the substrate 462. The length of the SCR catalyst 432 is denoted as the second zone length 432a in FIG. 4C.

Figure 4D:
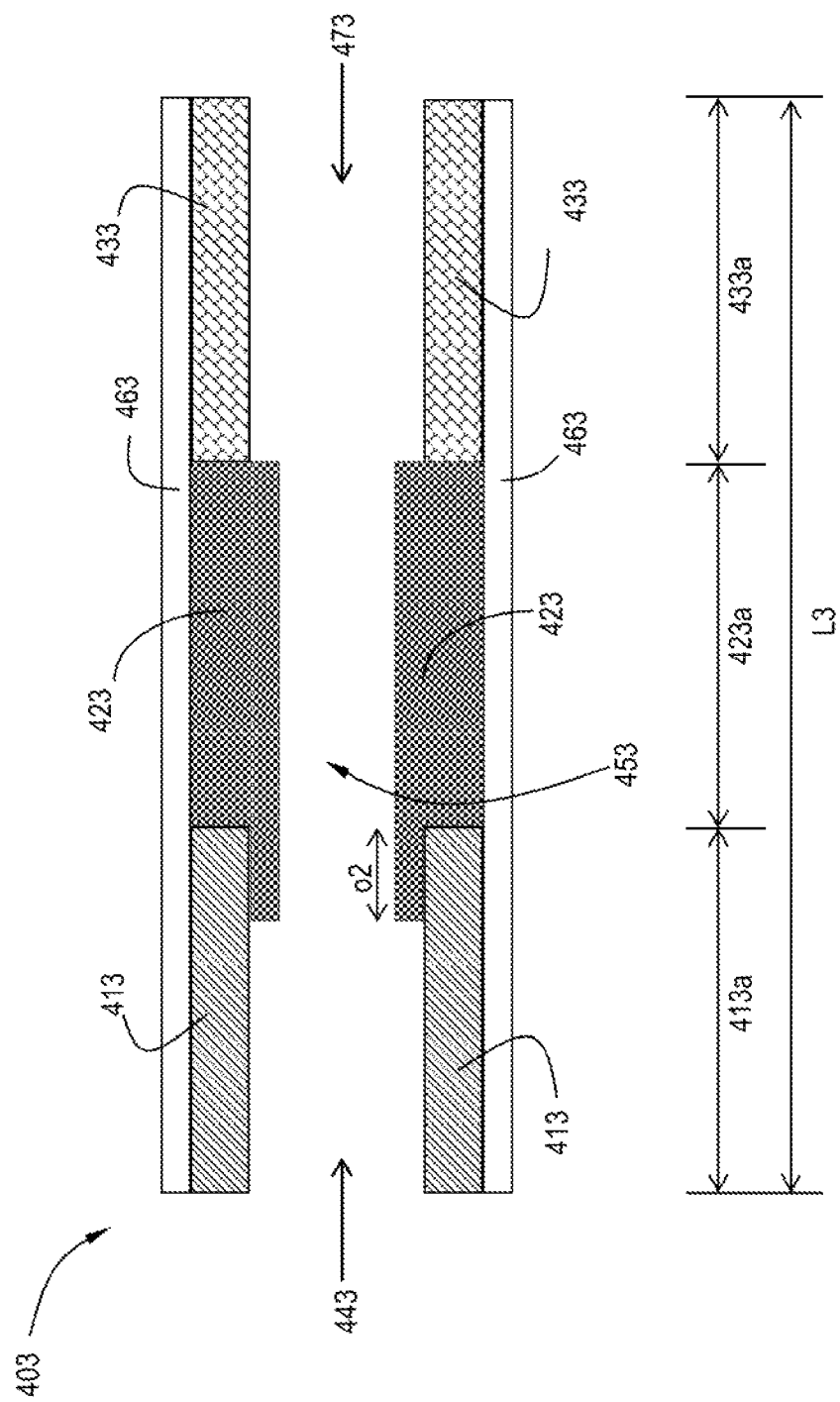

In other embodiments, as illustrated in FIG. 4D, the TWC catalyst 423 is at least partially overlapping the ammonia generating and hydrocarbon oxidation catalyst 413. More specifically, referring to FIG. 4D, an exemplary embodiment of an axially zoned system 403 is shown. The ammonia generating and hydrocarbon oxidation catalyst 413 is located upstream of the TWC catalyst 423 which is located upstream of the SCR catalyst 433 on a common substrate 463. The substrate 463 has an inlet end 443 and an outlet end 473 defining an axial length L3. In one or more embodiments, the substrate 463 generally comprises a plurality of channels 453 of a honeycomb substrate, of which only one channel is shown in cross-section for clarity. The ammonia generating and hydrocarbon oxidation catalyst 413 extends from the inlet end 443 of the substrate 463 through less than the entire axial length L3 of the substrate 463. The length of the ammonia generating and hydrocarbon oxidation catalyst 413 is denoted as first zone length 413a in FIG. 4D. The TWC catalyst 423 extends between the ammonia generating and hydrocarbon oxidation catalyst 413 and the SCR catalyst 433 through less than the entire axial length L3 of the substrate 463. The length of the TWC catalyst 423 is denoted as the second zone length 423a in FIG. 4D. As illustrated, the TWC catalyst 423 is at least partially overlapping the ammonia generating and hydrocarbon oxidation catalyst 413. The length of the overlap, o2, can vary. The SCR catalyst 433 extends from the outlet end 473 of the substrate 463 through less than the entire axial length L3 of the substrate 463. The length of the SCR catalyst 433 is denoted as the second zone length 433a in FIG. 4D.

Figure 4E:
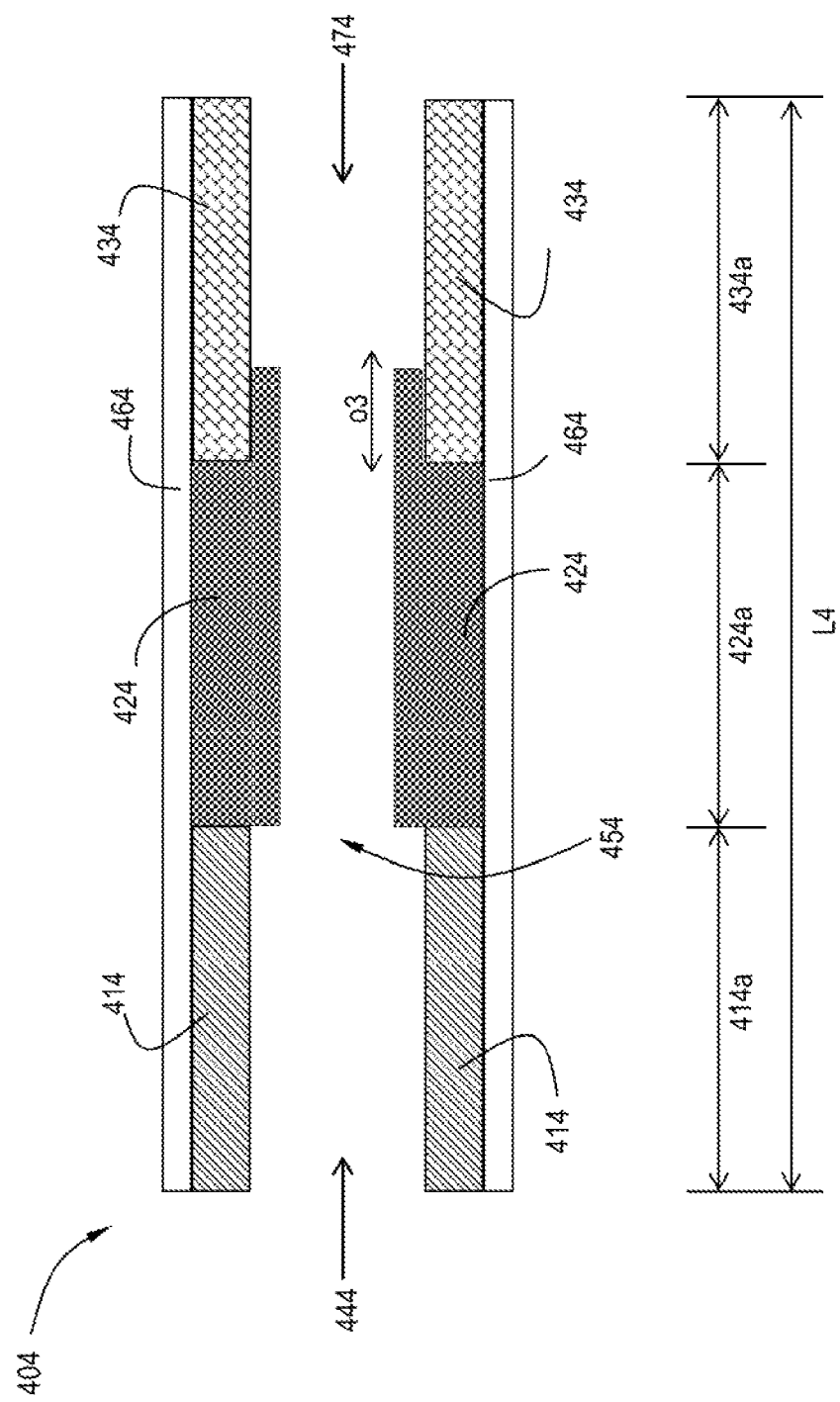

In yet further embodiments, as illustrated in FIG. 4E, the TWC catalyst 424 is at least partially overlapping the SCR catalyst 434. More specifically, referring to FIG. 4E, an exemplary embodiment of an axially zoned system 404 is shown. The ammonia generating and hydrocarbon oxidation catalyst 414 is located upstream of the TWC catalyst 424 which is located upstream of the SCR catalyst 434 on a common substrate 464. The substrate 464 has an inlet end 444 and an outlet end 474 defining an axial length L4. In one or more embodiments, the substrate 464 generally comprises a plurality of channels 454 of a honeycomb substrate, of which only one channel is shown in cross-section for clarity. The ammonia generating and hydrocarbon oxidation catalyst 414 extends from the inlet end 444 of the substrate 464 through less than the entire axial length L4 of the substrate 464. The length of the ammonia generating and hydrocarbon oxidation catalyst 414 is denoted as first zone length 414a in FIG. 4E. The TWC catalyst 424 extends between the ammonia generating and hydrocarbon oxidation catalyst 414 and the SCR catalyst 434 through less than the entire axial length L4 of the substrate 464. The length of the TWC catalyst 424 is denoted as the second zone length 424a in FIG. 4E. As illustrated, the TWC catalyst 424 is at least partially overlapping the SCR catalyst 434. The length of the overlap, o3, can vary. The SCR catalyst 434 extends from the outlet end 474 of the substrate 464 through less than the entire axial length L4 of the substrate 409. The length of the SCR catalyst 434 is denoted as the second zone length 434a in FIG. 4E.

Figure 4F:
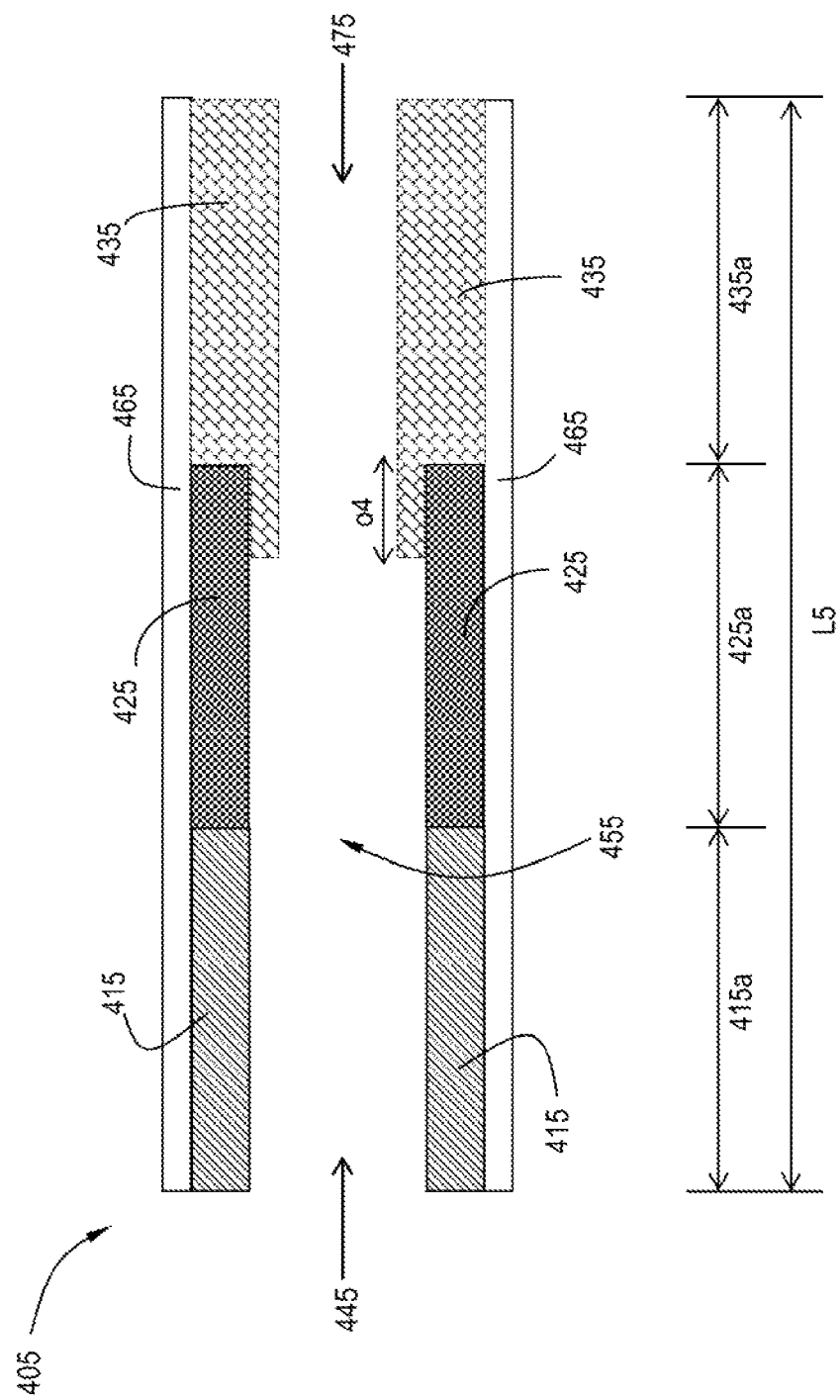

In still further embodiments, as illustrated in FIG. 4F, the SCR catalyst 435 is at least partially overlapping the TWC catalyst 425. More specifically, referring to FIG. 4F, an exemplary embodiment of an axially zoned system 405 is shown. The ammonia generating and hydrocarbon oxidation catalyst 415 is located upstream of the TWC catalyst 425 which is located upstream of the SCR catalyst 435 on a common substrate 465. The substrate 465 has an inlet end 445 and an outlet end 475 defining an axial length L5. In one or more embodiments, the substrate 465 generally comprises a plurality of channels 455 of a honeycomb substrate, of which only one channel is shown in cross-section for clarity. The ammonia generating and hydrocarbon oxidation catalyst 415 extends from the inlet end 445 of the substrate 465 through less than the entire axial length L5 of the substrate 465. The length of the ammonia generating and hydrocarbon oxidation catalyst 415 is denoted as first zone length 415a in FIG. 4F. The TWC catalyst 425 extends between the ammonia generating and hydrocarbon oxidation catalyst 415 and the SCR catalyst 435 through less than the entire axial length L5 of the substrate 465. The length of the TWC catalyst 425 is denoted as the second zone length 425a in FIG. 4F. As illustrated, the SCR catalyst 435 is at least partially overlapping the TWC catalyst 425. The length of the overlap, o4, can vary. The SCR catalyst 435 extends from the outlet end 475 of the substrate 465 through less than the entire axial length L5 of the substrate 465. The length of the SCR catalyst 435 is denoted as the second zone length 435a in FIG. 4F.

In one or more embodiments, the ammonia generating and hydrocarbon oxidation catalyst, the TWC catalyst, and the SCR catalyst are on a single substrate, which comprises a wall flow filter. In one or more embodiments, the ammonia generating and hydrocarbon oxidation catalyst is coated on the inlet passages of the wall flow filter, and the TWC and the SCR catalyst are coated on the outlet passages of the wall flow filter.

Figure 5:
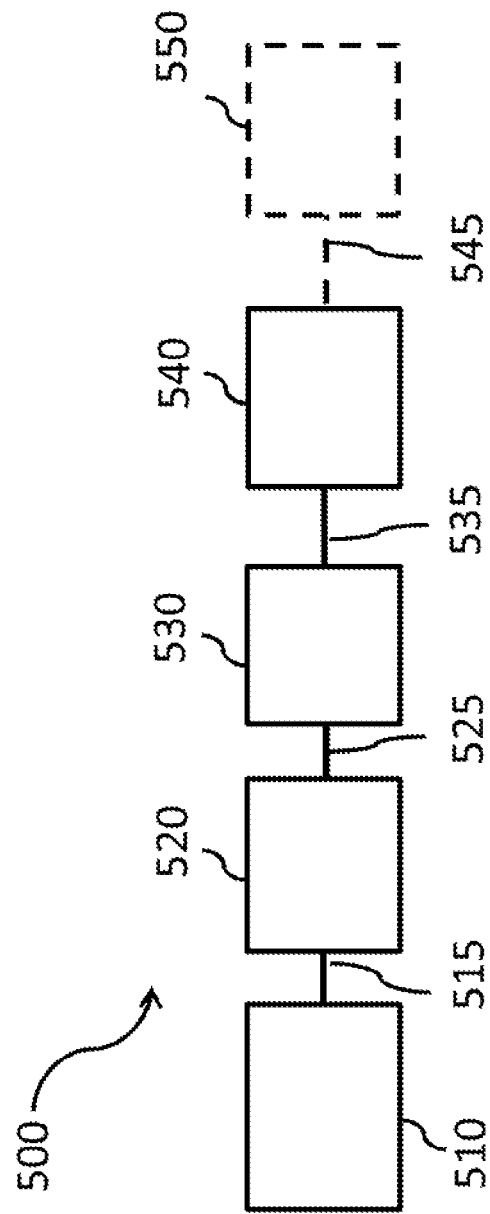
FIG. 5 is a diagram of an exemplary exhaust gas system configuration used in gasoline engines according to one or more embodiments of the invention.

Referring to FIG. 5, the engine exhaust system of one or more embodiments can further comprise an ammonia oxidation catalyst disposed downstream of the SCR catalyst to address any slipped ammonia. Specifically, FIG. 5 shows an engine exhaust system 500 comprising an ammonia generating and hydrocarbon oxidation catalyst 520 downstream from a gasoline engine 510 via an exhaust conduit 515, a TWC catalyst 530 downstream from the ammonia generating and hydrocarbon oxidation catalyst 530 via an exhaust conduit 525, and a SCR catalytic article 540 downstream from the ammonia generating and hydrocarbon oxidation catalyst 520 and the TWC catalyst 530 via an exhaust conduit 535. In one or more embodiments, the exhaust gas system 500 further comprises an optional catalyst 550 (e.g. ammonia oxidation catalyst, CO oxidation catalyst, etc.) disposed downstream of the SCR catalyst 540 via an exhaust conduit 545. It will be appreciated by one skilled in the art that one or more of the ammonia generating and hydrocarbon oxidation catalyst 520, the TWC catalyst 530, and the SCR catalyst 540 can be on a filter.

Figure 6:
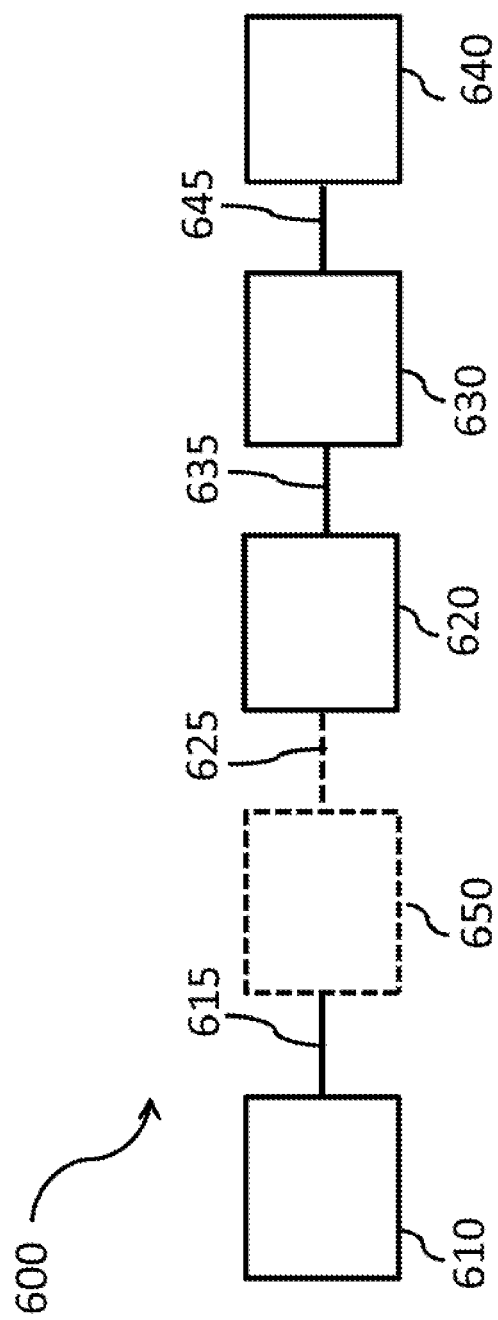
FIG. 6 is a diagram of an exemplary exhaust gas system configuration used in gasoline engines according to one or more embodiments of the invention.

Referring to FIG. 6, the engine exhaust gas treatment system of one or more embodiments can further comprises a wall flow filter disposed upstream of the SCR catalyst. Specifically, FIG. 6 shows an engine exhaust system 600 comprising an ammonia generating and hydrocarbon oxidation catalyst 620 downstream from a gasoline engine 610 via an exhaust conduit 615, an optional wall flow filter 650 upstream from the ammonia generating and hydrocarbon oxidation catalyst 620 via an optional exhaust conduit 625, a TWC catalyst 630 downstream from the ammonia generating and oxidation catalyst 620 via exhaust conduit 635, and a SCR catalyst 640 downstream from the TWC catalyst 630 via an exhaust conduit 645. In one or more embodiments, the wall flow filter 650 has a second three-way conversion (TWC) catalyst disposed thereon. In other embodiments, the wall flow filter 650 has the TWC catalyst 630 disposed thereon, as well as the ammonia generating and hydrocarbon oxidation catalyst 620 disposed thereon. In such embodiments, the optional exhaust conduit 625 is absent, as well as the exhaust conduit 635, from the engine exhaust system 600.

Without limitation, Table 1 presents various system configurations of one or more embodiments. It is noted that each component is connected to the next component via exhaust conduits such that the engine is upstream of component A, which is upstream of component B, which is upstream of component C, which is upstream of component D, which is upstream of component E (when present):

TABLE 1

| Component A | Component B | Component C | Component D | Component E |
|---|---|---|---|---|
| Ammonia generating and hydrocarbon oxidation catalyst | TWC | SCR | Optional AMOx | — |
| Ammonia generating catalyst | Ammonia generating and hydrocarbon oxidation catalyst | TWC | SCR | Optional AMOx |

TABLE 1-continued

| Component A | Component B | Component C | Component D | Component E |
|---|---|---|---|---|
| Ammonia generating and hydrocarbon oxidation catalyst | Ammonia generating catalyst | TWC | SCR | Optional AMOx |
| Ammonia generating catalyst | TWC | Ammonia generating and hydrocarbon oxidation catalyst | SCR | Optional AMOx |

As recognized by one skilled in the art, of the configurations listed in Table 1, any of components A, B, C, D, or E can be disposed on a particulate filter.

Method of Treating Engine Exhaust:

Another aspect of the present invention is directed to a method of treating the exhaust gas stream of an engine. In one or more embodiments, a method for treatment of an engine exhaust gas stream of a gasoline engine comprises flowing the engine exhaust gas stream over an ammonia generating and hydrocarbon oxidation catalyst of one of more embodiments; and directing the exhaust gas stream through a three-way conversion (TWC) catalyst downstream from the ammonia generating and hydrocarbon oxidation catalyst and through a selective catalytic reduction (SCR) catalyst downstream from the TWC catalyst.

Another further of the present invention is directed to a method of treating the exhaust gas stream of an engine. In one or more embodiments, a method for treatment of an engine exhaust gas stream of a gasoline engine comprises flowing the engine exhaust gas stream over an ammonia generating catalyst and directing the exhaust gas stream through a three-way conversion (TWC) catalyst downstream from the ammonia generating catalyst; directing the exhaust gas stream through an ammonia generating and hydrocarbon oxidation catalyst of one or more embodiments downstream from the TWC catalyst; and then through a selective catalytic reduction (SCR) catalyst downstream from the TWC catalyst.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1—Preparation of Catalysts 1A-1E, 3B, 3C

The catalysts contained an activated γ-alumina, platinum, and palladium at different platinum and palladium loadings, as specified in Table 2. Pd in the form of palladium nitrate and Pt in the form of platinum amine solution were introduced onto the γ-$Al_2O_3$ by conventional incipient wetness techniques. The catalysts were coated onto a flow-through monolith substrate carrier having a cell density of 900 cells per square inch (cpsi) and a 2.5 mil wall thickness. The total washcoat loading after 550° C. calcination for one hour in air was about 1.8 g/$in^3$.

Example 2—Preparation of Comparative Example 1F

The catalyst contained an activated γ-alumina, zirconia, lanthana, neodymia, strontia, and palladium at concentrations of approximately 67%, 5%, 10%, 9%, 5%, and 3.8%, respectively, based on the calcined weight of the catalyst. Pd in the form of palladium nitrate was introduced onto the γ-$Al_2O_3$ by conventional incipient wetness techniques. The catalyst was coated onto a flow-through monolith substrate carrier having a cell density of 900 cells per square inch (cpsi) and a 2.5 mil wall thickness. The total washcoat loading after 550° C. calcination for one hour in air was about 1.8 g/$in^3$.

TABLE 2

| Sample ID | 1A | 1B | 1C | 1D | 1E (Comp.) | 1F (Comp.) |
|---|---|---|---|---|---|---|
| Pt (g/$ft^3$) | 245 | 216 | 135 | 54 | 0 | 0 |
| Pd (g/$ft^3$) | 25 | 54 | 135 | 216 | 270 | 120 |
| Pt/Pd Ratio | ~10/1 | 4/1 | 1/1 | 1/4 | 0/270 | 0/120 |

Example 3—HC Conversion Efficiency

Figure 7:
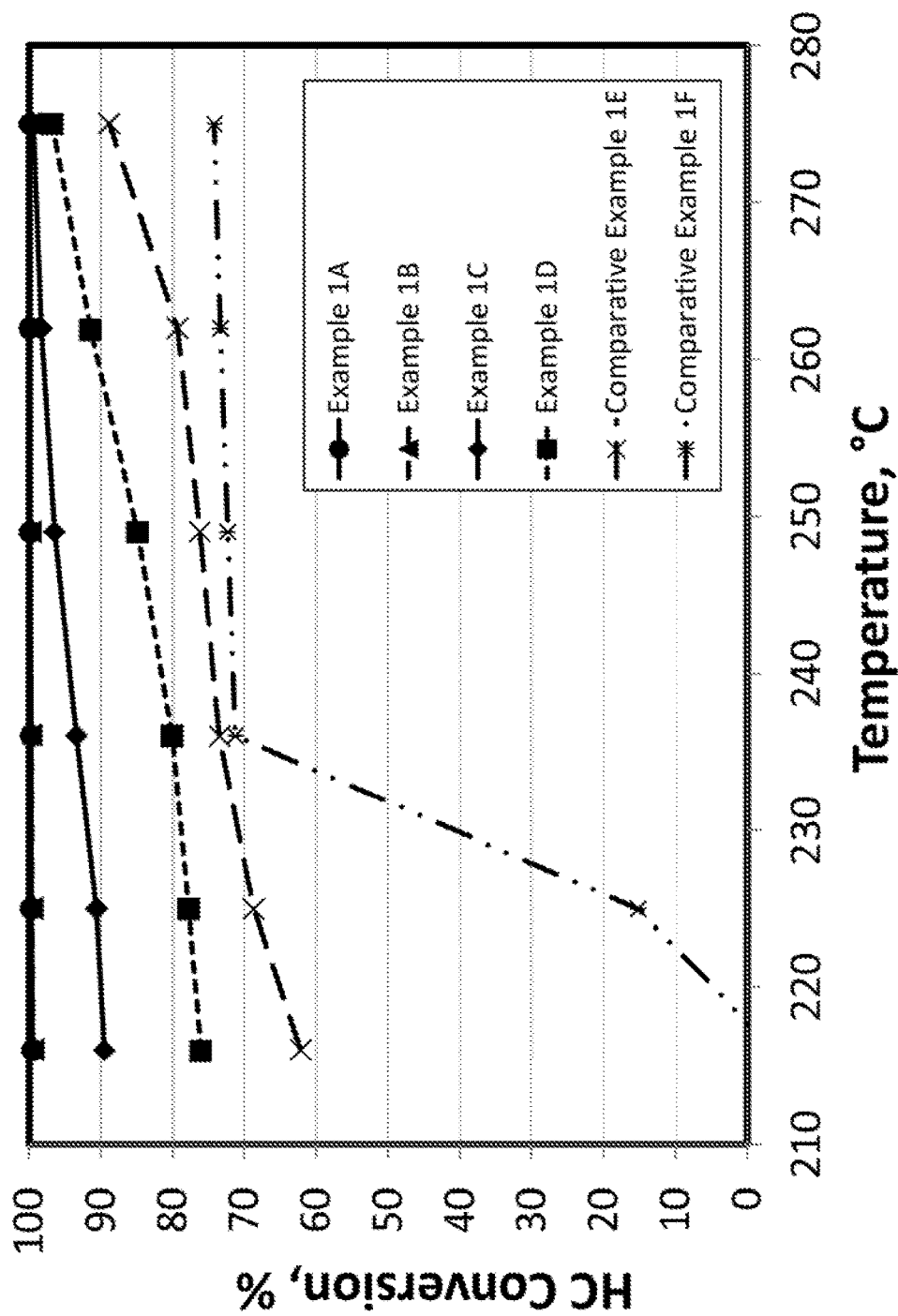
FIG. 7 is a graph showing HC conversion for samples prepared according to the Examples.

HC conversion efficiency for the Example 1 Samples 1A-1F was tested after aging at 950° C. for 40 hours. HC conversion efficiency in lean conditions at temperatures from 215 to 275° C. was measured, and the results are presented in FIG. 7. HC conversion increased with increasing Pt/Pd ratio. Pd only samples showed the lowest HC conversion. Example 1A at Pt/Pd of about 10/1 and Example 1B at Pt/Pd of 4/1 exhibited the highest HC conversion. Both Samples achieved 99.5% HC conversion at 215° C.

HC conversion efficiency in lean conditions, as in Example 2, were measured for the Samples presented in Table 3 below, which had varying total PGM loadings of 270, 198, or 132 g/$ft^3$ and a Pt/Pd ratio of about 10/1.

TABLE 3

| Sample ID | 1A | 3B | 3C | 1F (Comp.) |
|---|---|---|---|---|
| Total PGM Loading (g/$ft^3$) | 270 | 198 | 132 | 120 |
| Pt (g/$f^3$) | 245 | 180 | 120 | 0 |
| Pd (g/$f^3$) | 25 | 18 | 12 | 120 |
| Pt/Pd Ratio | ~10/1 | 10/1 | 10/1 | 0/120 |

Figure 8:
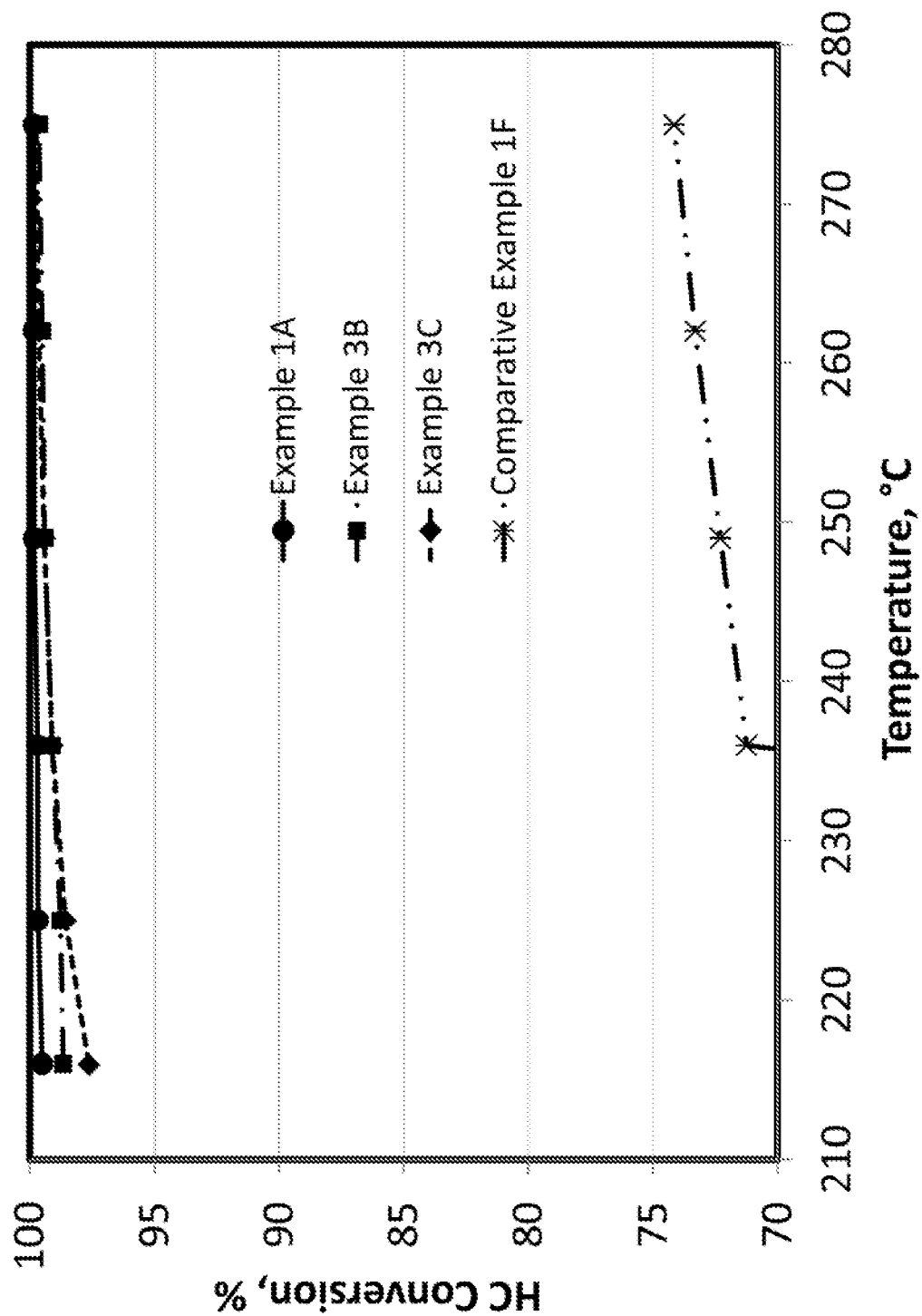
FIG. 8 is a graph showing HC conversion for samples prepared according to the Examples.

HC conversion efficiency for the Examples 1A, 3B, 3C and 1F was tested after aging at 950° C. for 40 hours. As illustrated in FIG. 8, reducing the total PGM loading from 270 to 198 or to 132 g/$ft^3$, while maintaining the Pt/Pd ratio at about 10/1 only slightly decreased HC conversion. At 215° C., Example 3B at 198 g/$ft^3$ converted 98.7% of HC, and Example 3C at 132 g/$ft^3$ converted 97.6% of HC. The HC conversions exhibited by these samples were tremendously higher than that of the Comparative Example 1F, having no platinum.

Example 4—$NO_x$ to $NH_3$ Conversion Efficiency

The $NO_x$ to $NH_3$ conversion efficiency of Examples 1A-1F were evaluated after degreening at 750° C. for 2.5 hours and after aging at 950° C. for 40 hours. The catalysts were evaluated on a reactor test rig with FTIR analytical apparatus. The evaluations were conducted with cycles of a 60 seconds lean gas exposure and then followed by a 60 seconds rich gas exposure. The feeding gases contained $NO_x$ hydrocarbons, CO, $CO_2$, $H_2O$ and $N_2$. The rich gas lambda was 0.97. The temperature was 355° C. in lean and 450° C. in rich.

Figure 9:
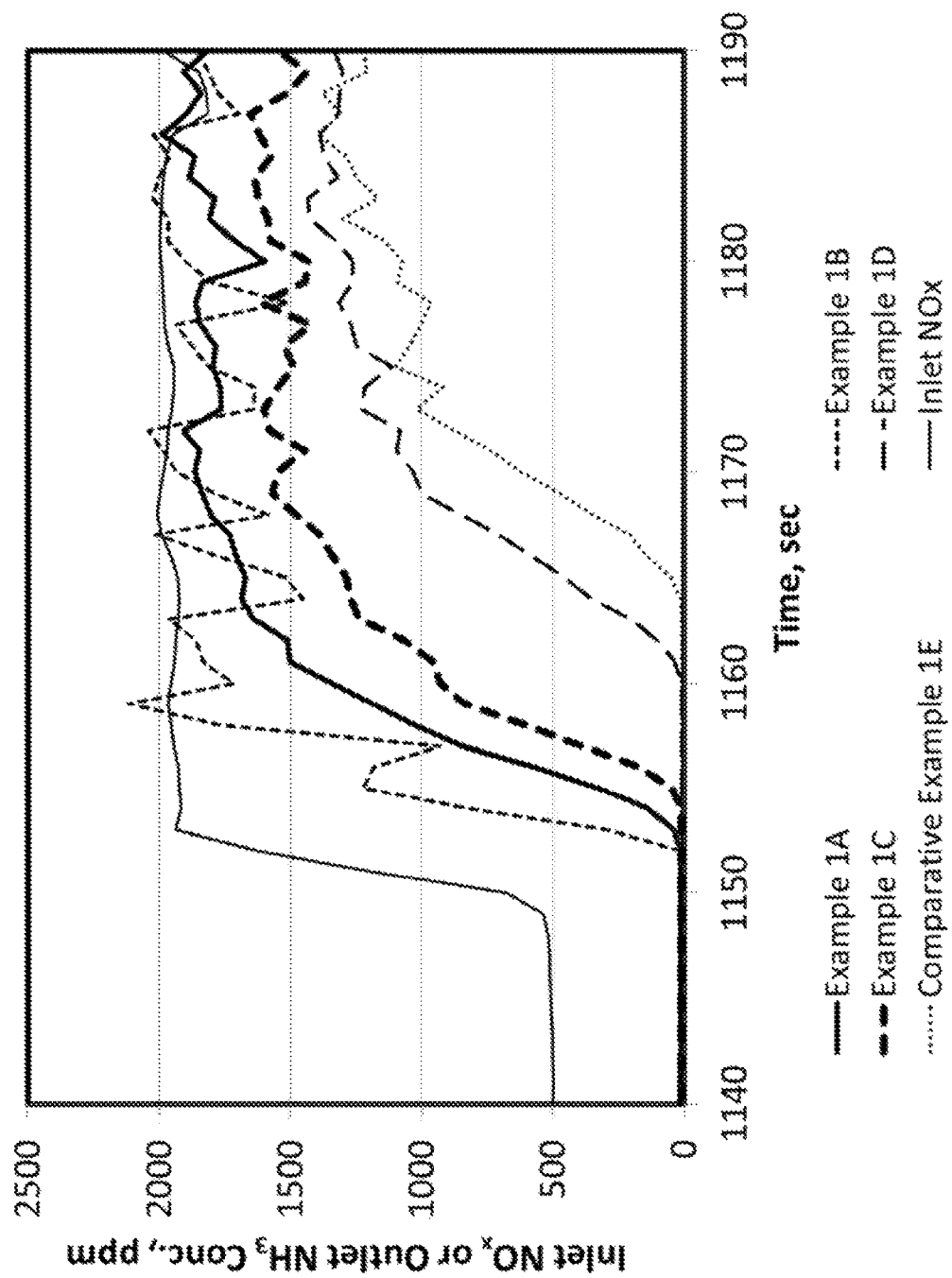
FIG. 9 is a graph showing the inlet $NO_x$ and outlet $NH_3$ concentrations for samples prepared according to the Examples.
Figure 10:
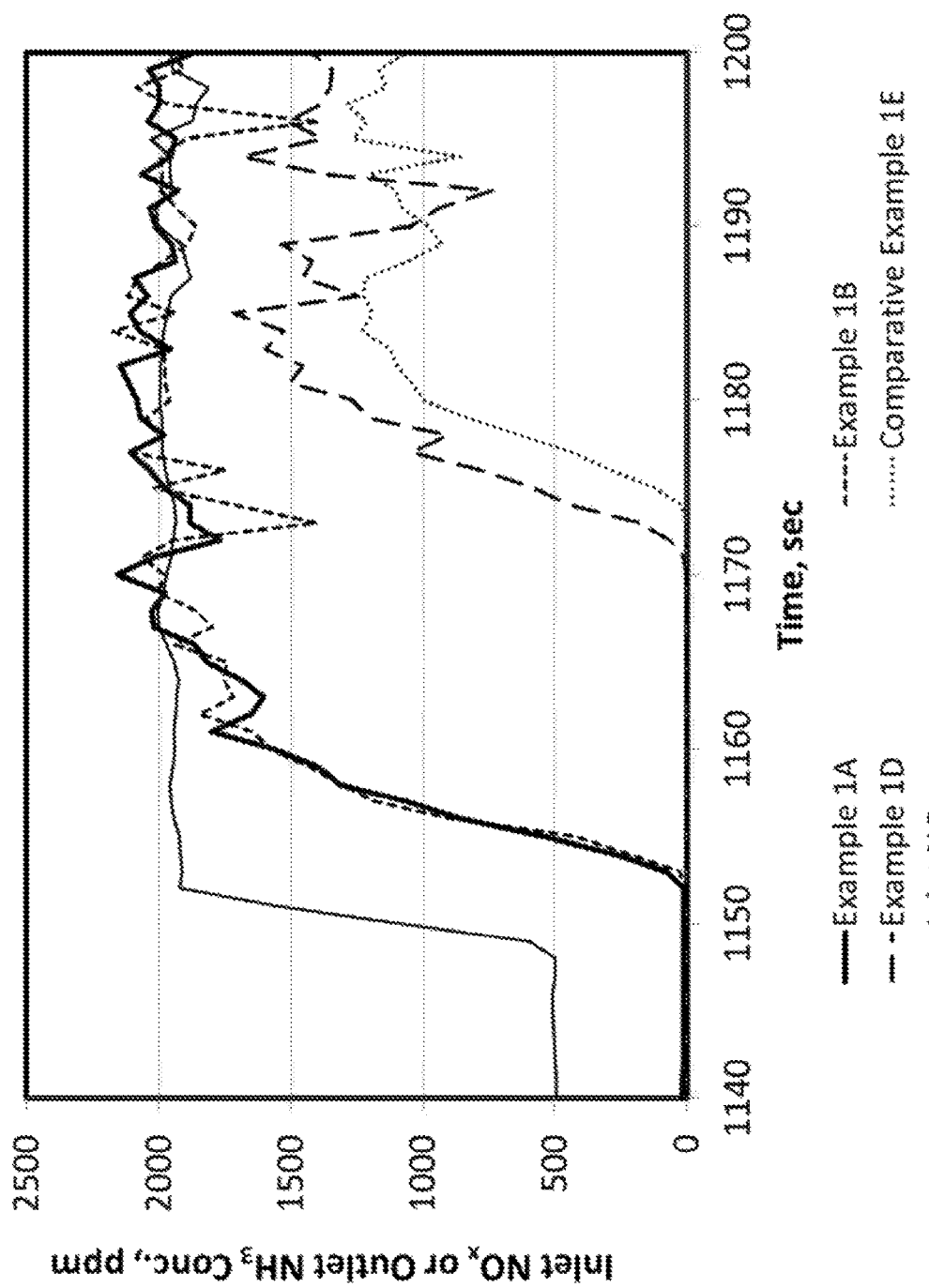
FIG. 10 is a graph showing the inlet $NO_x$ and outlet $NH_3$ concentrations for samples prepared according to the Examples.

At the same total PGM loading of 270 g/ft³, $NO_x$ to $NH_3$ conversion increased with Pt/Pd ratio increasing. After 950° C. aging, both Example 1A (Pt/Pd of ~10/1) and Example 1B (Pt/Pd of 4/1) achieved nearly 100% of $NO_x$ to $NH_3$ conversion when rich lambda equaled 0.97 (FIG. 9). After degreening at 750° C., both Example 1A (Pt/Pd of ~10/1) and Example 1B (Pt/Pd of 4/1) converted 100% of $NO_x$ to $NH_3$ at lambda 0.97 (FIG. 10). $Pt/Pd/Al_2O_3$ catalysts rich in Pd or Pd-only catalysts not only showed inferior $NO_x$ to $NH_3$ conversion efficiency, but also showed delayed $NH_3$ formation during the transition from lean to rich because PdO consumes reductants ($H_2$/CO).

Example 5—Preparation of $Pt/Al_2O_3$, $Pd/Al_2O_3$ and $Pt,Pd/Al_2O_3$ Powder Samples Pt, in the form of platinum amine solution, and Pd, in the form of palladium nitrate, according to the quantities listed in Table 4, were impregnated onto $\gamma$-$Al_2O_3$ by conventional incipient wetness techniques. The samples were dried at 120° C. for 8 hours, followed by calcination at 550° C. for 4 hours.

TABLE 4

| Sample ID | 5A | 5B | 5C | 5D | 5E | 5F |
|---|---|---|---|---|---|---|
| Pt % | 8.90 | 8.08 | 7.12 | 4.45 | 1.78 | 0 |
| Pd % | 0 | 0.826 | 1.78 | 4.45 | 7.12 | 8.90 |

Example 6—$H_2$ Temperature Programmed Reduction (TPR) Measurement

Reducibility of the Example 5 samples were measured by $H_2$ TPR. Prior to measurement, the samples were treated at 450° C. in 4% $O_2$/He for 20 min, and then cooled to −50° C. in He (g). TPR was measured in the presence of 1% $H_2$/$N_2$ with temperature ramping up from −50 to 700° C. at a rate of 10° C./min. The volumes of $H_2$ consumed to reduce per gram of each sample were plotted in FIGS. 11A and 11B. Each sample was measured after degreening at 750° C. for 2.5 hours (FIG. 11A) and also after aging at 950° C. for 40 hours in 2% $O_2$ and 10% $H_2O$ balanced with $N_2$ (FIG. 11B).

Figure 11A:
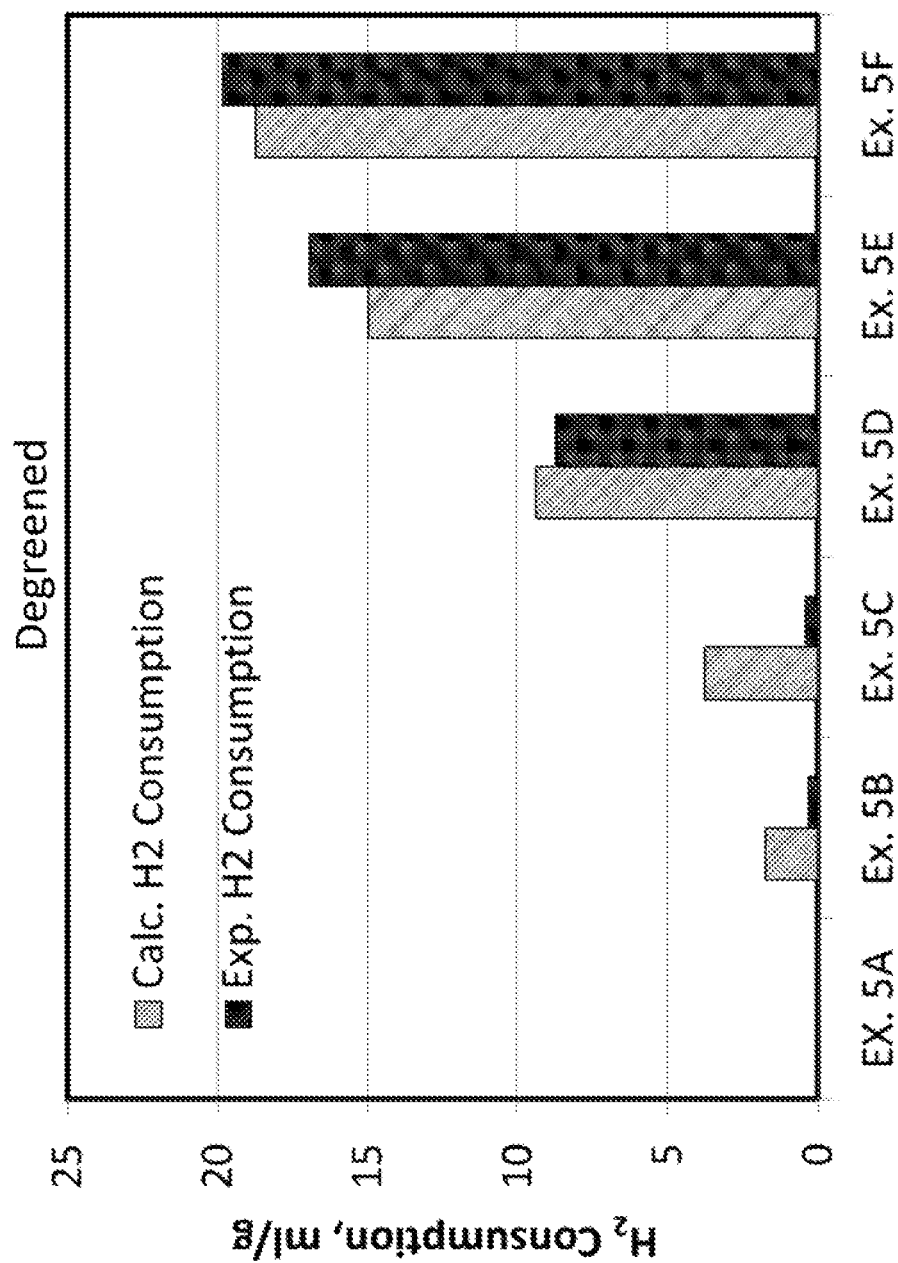
FIG. 11A is a bar chart showing the showing the volumes of $H_2$ consumed per gram for samples prepared according to the Examples.
Figure 11B:
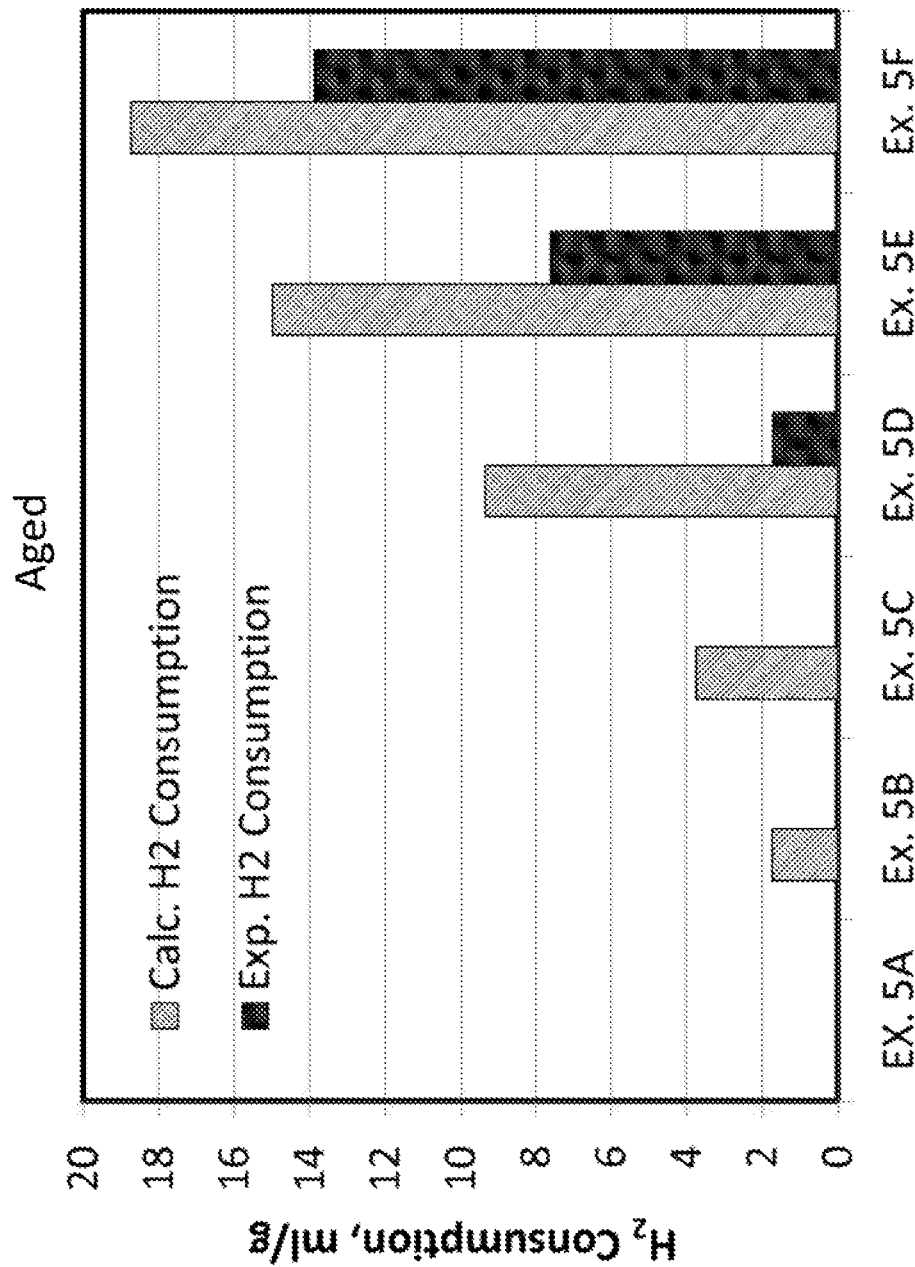
FIG. 11B is a bar chart showing the showing the volumes of $H_2$ consumed per gram for samples prepared according to the Examples.

As illustrated in FIGS. 11A and 11B, the $H_2$-TPR study on Example 5 samples at various Pt/Pd ratios demonstrated that $Pt/Al_2O_3$ and $Pt/Pd/Al_2O_3$ samples which are rich in Pt (Pt/Pd ratio at 10/1 and 4/1) consume minimal quantity of $H_2$. On the other hand, $Pd/Al_2O_3$ and $Pt/Pd/Al_2O_3$ rich in Pd (Pt/Pd ratio at 1/1 and 1/4) consumed high quantity of $H_2$. Volumes of $H_2$ consumed by the degreened $Pd/Al_2O_3$, $Pt/Pd/Al_2O_3$ at 1/1 and 1/4 were similar to the calculated $H_2$ consumption volumes based on the assumption that all PdO is reduced to Pd. Volumes of $H_2$ consumed by the aged $Pd/Al_2O_3$ and $Pt/Pd/Al_2O_3$ at 1/4 were lower than the calculated values, but they were significantly higher than those of the $Pt/Pd/Al_2O_3$ rich in Pt, and the $H_2$ consumption linearly increased with Pd loading increasing. The $H_2$ consumption by $Pt/Pd/Al_2O_3$ in different Pt/Pd ratio was consistent with the $NH_3$ formation delay that was observed in the $NO_x$ to $NH_3$ conversion test.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A gasoline engine exhaust gas treatment system comprising:
    an ammonia generating and hydrocarbon oxidation catalyst comprising a refractory metal oxide support, a platinum component, and a palladium component, wherein the platinum component and the palladium components are present in a platinum to palladium (Pt/Pd) ratio of about 2/1 to about 20/1, and wherein the ammonia generating and hydrocarbon oxidation catalyst contains less than 1 wt. % of ceria and less than 5 wt. % of a NOx storage component;
    a three-way conversion (TWC) catalyst; and
    an ammonia selective catalytic reduction (SCR) catalyst downstream of the three-way conversion catalyst.

2. The gasoline engine exhaust gas treatment system of claim 1, wherein the refractory metal oxide support is selected from alumina, silica, titania, zirconia and combinations thereof.

3. The gasoline engine exhaust gas treatment system of claim 1, wherein the TWC catalyst is downstream of the ammonia generating and hydrocarbon oxidation catalyst.

4. The gasoline engine exhaust gas treatment system of claim 1, wherein the ammonia generating and hydrocarbon oxidation catalyst and the TWO catalyst are on separate substrates.

5. The gasoline engine exhaust gas treatment system of claim 1, wherein the ammonia generating and hydrocarbon oxidation catalyst and the TWC catalyst are on a single substrate.

6. The gasoline engine exhaust gas treatment system of claim 1, wherein the SCR catalyst comprises one or more of a molecular sieve material and a mixed oxide.

7. The gasoline engine exhaust gas treatment system of claim 6, wherein the molecular sieve material has a double six-ring (d6r) unit.

8. The gasoline engine exhaust gas treatment system of claim 7, wherein the molecular sieve material has a framework type code selected from the group consisting of AEI, CHA, and AFX.

9. The gasoline engine exhaust gas treatment system of claim 8, wherein the molecular sieve material has the CHA framework type.

10. The gasoline engine exhaust gas treatment system of claim 6, wherein the molecular sieve material has a silica to alumina ratio in a range of about 2 to about 100.

11. The gasoline engine exhaust gas treatment system of claim 6, wherein the molecular sieve material is promoted with a metal selected from the group consisting of Cu, Fe, Co, Ni, La, Ce, Mn, V, Ag, and combinations thereof.

12. The gasoline engine exhaust gas treatment system of claim 1, wherein the SCR catalyst is disposed on a wall-flow filter.

13. The gasoline engine exhaust gas treatment system of claim 1, wherein the SCR catalyst is disposed on a flow-through substrate.

14. The gasoline engine exhaust gas treatment system of claim 1, wherein a wall flow filter is disposed upstream from the SCR catalyst, the filter having the three-way conversion (TWC) catalyst thereon.

15. The gasoline engine exhaust gas treatment system of claim 1, wherein a wall flow filter is disposed upstream from the SCR catalyst, the filter having the ammonia generating and hydrocarbon oxidation catalyst thereon.

16. The gasoline engine exhaust gas treatment system of claim 1, further comprising an ammonia oxidation catalyst downstream of the SCR catalyst.

17. The gasoline engine exhaust gas treatment system of claim 1, wherein the TWC catalyst comprises one or more of a platinum group metal, an oxygen storage component, and a refractory metal oxide support.

18. An exhaust gas treatment system comprising:
   an ammonia generating and hydrocarbon oxidation catalyst that is substantially free of ceria and substantially free of NOx storage components, wherein the ammonia generating and hydrocarbon oxidation catalyst comprises a refractory metal oxide support, a platinum component, and a palladium component, wherein the platinum component and the palladium components are present in a platinum to palladium ratio of greater than about 2 to 1;
   a three-way conversion (TWC) catalyst; and
   an ammonia selective catalytic reduction (SCR) catalyst comprising a molecular sieve material having a double six-ring (d6r) unit downstream of the ammonia generating and hydrocarbon oxidation catalyst and the TWC catalyst.

19. The exhaust gas treatment system of claim 18, wherein the TWO catalyst is downstream from the ammonia generating and hydrocarbon oxidation catalyst.

20. A method of treating an engine exhaust gas stream from a gasoline engine, the method comprising:
   flowing the engine exhaust gas stream over an ammonia generating and hydrocarbon oxidation catalyst; and
   directing the exhaust gas stream through a three-way conversion (TWO) catalyst downstream from the ammonia generating and hydrocarbon oxidation catalyst and a selective catalytic reduction (SCR) catalyst downstream from the TWC catalyst,
   wherein the ammonia generating and hydrocarbon catalyst contains less than 1 wt. % of ceria and less than 5 wt. % of NOx storage components,
   wherein the ammonia generating and hydrocarbon catalyst comprises a refractory metal oxide support, a platinum component, and a palladium component, and wherein the platinum component and the palladium component are present in a platinum to palladium ratio of about 2/1 to about 20/1.

* * * * *

UNITED STATES PATENT AND TRADEMARK OFFICE
CERTIFICATE OF CORRECTION

PATENT NO. : 10,450,918 B2  
APPLICATION NO. : 15/735509  
DATED : October 22, 2019  
INVENTOR(S) : Wen-Mei Xue et al.

Page 1 of 1

It is certified that error appears in the above-identified patent and that said Letters Patent is hereby corrected as shown below:

In the Claims

In Claim 4, at Column 24, Line 46, please change "TWO" to --TWC--.

In Claim 19, at Column 26, at Line 11, please change "TWO" to --TWC--; and

In Claim 20, at Column 26, Line 18, please change "TWO" to --TWC--.

Signed and Sealed this  
Twenty-first Day of May, 2024

Katherine Kelly Vidal  
*Director of the United States Patent and Trademark Office*